United States Patent
Malladi et al.

(10) Patent No.: US 9,295,048 B2
(45) Date of Patent: Mar. 22, 2016

(54) METHOD AND APPARATUS FOR SUPPORTING HYBRID CARRIER AGGREGATION

(71) Applicant: QUALCOMM Incorporated, San Diego, CA (US)

(72) Inventors: Durga Prasad Malladi, San Diego, CA (US); Jelena M. Damnjanovic, Del Mar, CA (US); Yongbin Wei, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 14/018,285

(22) Filed: Sep. 4, 2013

(65) Prior Publication Data
US 2014/0086078 A1    Mar. 27, 2014

Related U.S. Application Data

(60) Provisional application No. 61/705,092, filed on Sep. 24, 2012.

(51) Int. Cl.
*H04W 72/04* (2009.01)
*H04J 3/16* (2006.01)
(Continued)

(52) U.S. Cl.
CPC .......... *H04W 72/042* (2013.01); *H04J 3/1694* (2013.01); *H04J 4/00* (2013.01); *H04L 5/001* (2013.01); *H04L 5/006* (2013.01);
(Continued)

(58) Field of Classification Search
None
See application file for complete search history.

(56) References Cited

U.S. PATENT DOCUMENTS

2007/0097887 A1*  5/2007  Kim et al. ............... 370/276
2009/0097423 A1*  4/2009  Choi et al. ............... 370/280
(Continued)

OTHER PUBLICATIONS

3GPP: "3rd Generation Partnership Project; Technical Specification Group Radio Access Network; Further Enhancements to LTE TDD for DL-UL Interference Management and Traffic Adaptation; ( Release 11)", 3GPP Draft; TR 36.828, V2. 0.0, 3rd Generation Partnership Project (3GPP), Mobile Competence Centre ; 650 , Route Des Lucioles ; F-06921 Sophia-Antipolis Cedex; France, Jun. 10, 2012, XP050601302, [retrieved on Jun. 10, 2012].
(Continued)

*Primary Examiner* — Ashley Shivers
(74) *Attorney, Agent, or Firm* — Arent Fox LLP

(57) ABSTRACT

A method, an apparatus, and a computer program product for wireless communication are provided. The apparatus, e.g., base station, determines a plurality of component carriers configured for a user equipment (UE) served by the apparatus. The plurality of component carriers includes a primary component carrier and a secondary component carrier. The primary component carrier may be a time division duplex (TDD) carrier having a same uplink:downlink configuration as a first cell at a neighboring base station, and the secondary component carrier may be a TDD carrier having a different uplink:downlink configuration as a second cell at the neighboring base station. The apparatus exchanges data with the UE according to an effective uplink-downlink subframe partition of the configured component carriers. The effective uplink-downlink subframe partition may be time varying and the apparatus may operate to limit interference due to the different TDD configurations at the serving and neighbor cells.

52 Claims, 18 Drawing Sheets

(51) Int. Cl.
*H04J 4/00* (2006.01)
*H04L 5/00* (2006.01)
*H04L 5/14* (2006.01)

(52) U.S. Cl.
CPC .......... *H04L 5/0055* (2013.01); *H04L 5/1469* (2013.01); *H04W 72/04* (2013.01); *H04W 72/0453* (2013.01)

(56) References Cited

U.S. PATENT DOCUMENTS

| | | | |
|---|---|---|---|
| 2010/0254329 A1 | 10/2010 | Pan et al. | |
| 2011/0167435 A1* | 7/2011 | Fang | 719/329 |
| 2011/0176435 A1 | 7/2011 | Khandekar et al. | |
| 2011/0211503 A1* | 9/2011 | Che et al. | 370/280 |
| 2011/0237243 A1* | 9/2011 | Guvenc et al. | 455/423 |
| 2012/0057560 A1 | 3/2012 | Park et al. | |
| 2012/0069795 A1 | 3/2012 | Chung et al. | |
| 2012/0165029 A1* | 6/2012 | Lindbom et al. | 455/450 |
| 2012/0307689 A1* | 12/2012 | Kim et al. | 370/280 |
| 2013/0016659 A1* | 1/2013 | Kone | 370/328 |
| 2013/0034064 A1 | 2/2013 | Nam et al. | |
| 2013/0039193 A1* | 2/2013 | Yin et al. | 370/252 |
| 2013/0039296 A1 | 2/2013 | Damnjanovic et al. | |
| 2013/0058234 A1* | 3/2013 | Yang | H04L 27/261 370/252 |
| 2013/0182583 A1* | 7/2013 | Siomina et al. | 370/252 |
| 2013/0194981 A1* | 8/2013 | Wang et al. | 370/280 |
| 2013/0242819 A1* | 9/2013 | He | H04W 72/0413 370/280 |

OTHER PUBLICATIONS

International Search Report and Written Opinion—PCT/US2013/058319—ISA/EPO—Dec. 5, 2013.

Iwamura M., et al., "Carrier aggregation framework in 3GPP LTE-advanced [WiMAX/LTE Update]", IEEE Communications Magazine, IEEE Service Center, Piscataway, US, vol. 48, No. 8, Aug. 1, 2010, pp. 60-67, XP011315996, ISSN: 0163-6804 Section "Mobility and Interference Management with CA"; p. 66.

Khoryaev A., et al., "Feasibility Analysis of Dynamic Adjustment of TDD Configurations in Macro-Femto Heterogeneous LTE Networks", Aug. 27, 2012, Internet of Things, Smart Spaces , and Next Generation Networking, Springer Berlin Heidelberg, Berlin, Heidelberg, pp. 174-185, XP047014870, ISBN: 978-3-642-32685-1.

Pantech, "Views on support of different TDD configuration in Rel-11", 3GPP Draft; R1-112280, 3rd Generation Partnership Project (3GPP), Mobile Competence Centre; 650, Route Des Lucioles ; F-06921 Sophia-Antipolis Cedex ; France, vol. RAN WG1, no. Athens, Greece; 20110822, Aug. 16, 2011, XP050537427, [retrieved on Aug. 16, 2011].

Shen Z., et al., "Overview of 3GPP LTE-advanced carrier aggregation for 4G wireless communications", IEEE Communications Magazine, IEEE Service Center, Piscataway, US, vol. 50, No. 2, Feb. 1, 2012, pp. 122-130, XP011417048, ISSN: 0163-6804, DOI: 10.1109/MCOM.2012.6146491 Section "CSI Feedback"; p. 128 Section "Future Enhancements"; p. 129.

* cited by examiner

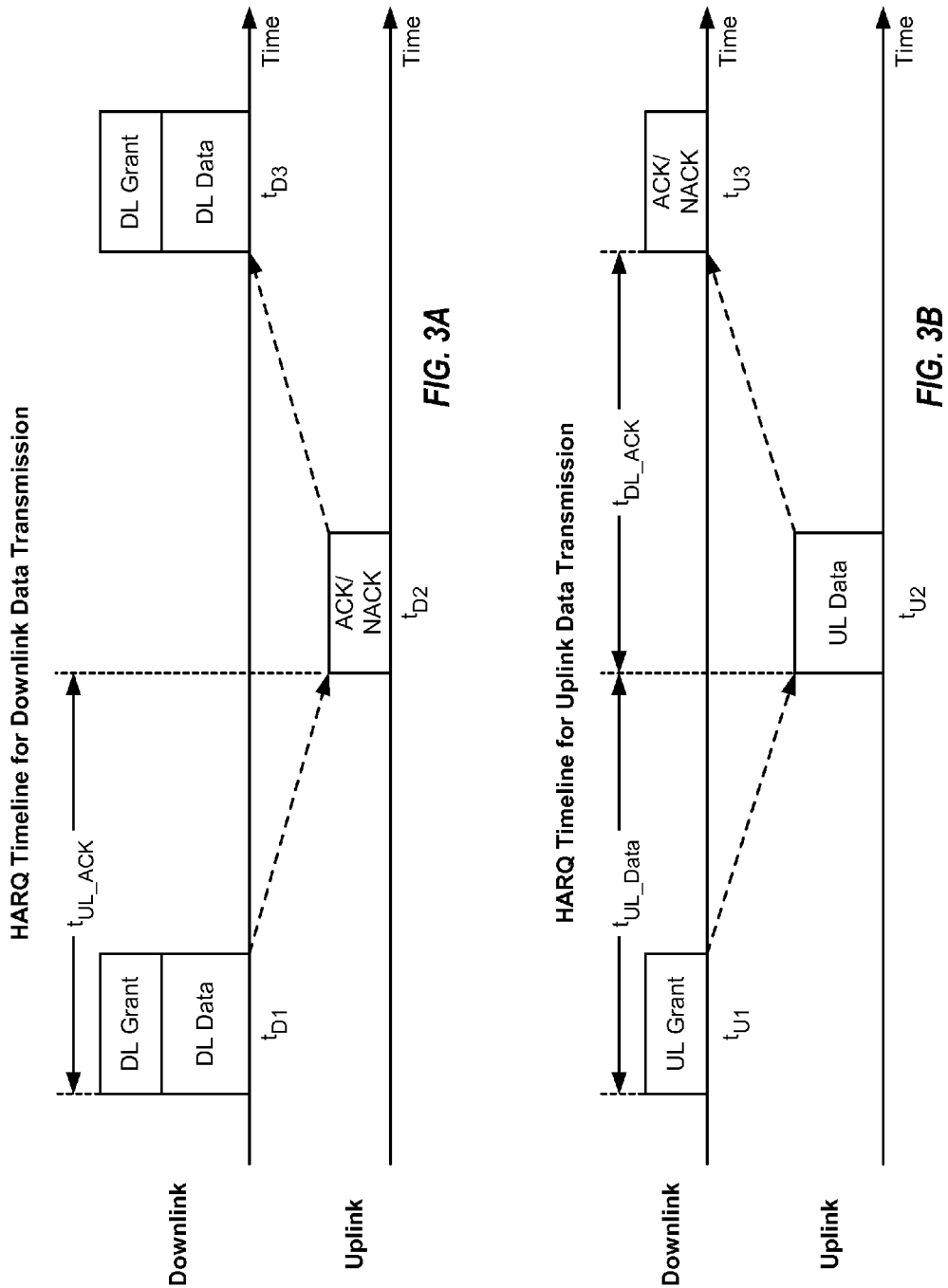

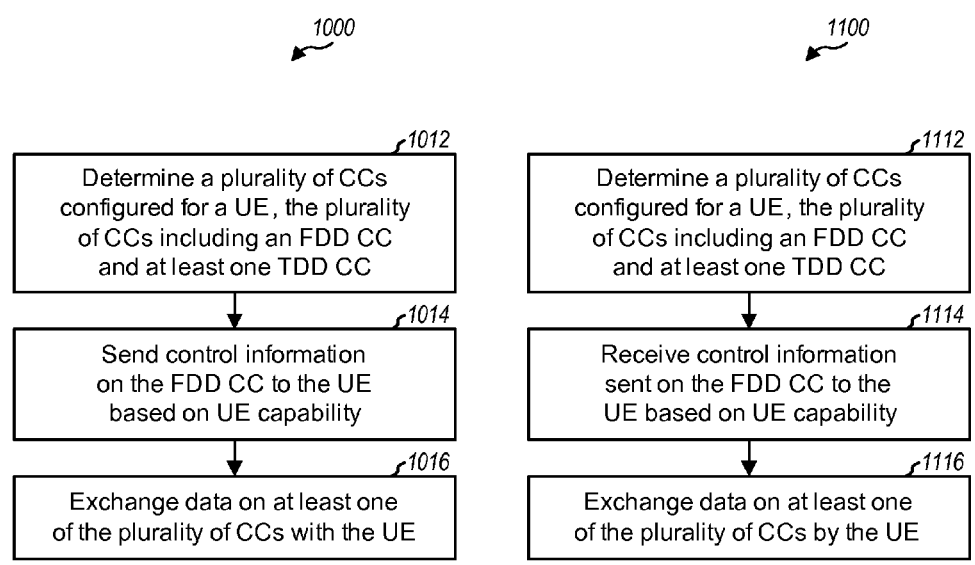

METHOD AND APPARATUS FOR SUPPORTING HYBRID CARRIER AGGREGATION

CROSS-REFERENCE TO RELATED APPLICATION(S)

This application claims the benefit of U.S. Provisional Application Ser. No. 61/705,092, entitled "Method and Apparatus For Supporting Hybrid Carrier Aggregation" and filed on Sep. 24, 2012, which is expressly incorporated by reference herein in its entirety.

BACKGROUND

1. Field

The present disclosure relates generally to wireless communication, and more specifically to techniques and apparatuses for supporting hybrid carrier aggregation in a wireless communication network.

2. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics. For example, a carrier may be associated with system information and/or control information describing operation on the carrier. A carrier may also be referred to as a component carrier (CC), a cell, a serving cell, a frequency channel, etc. A base station may send data and control information on one or more carriers to a UE. The UE may also send data and control information on one or more carriers to the base station.

SUMMARY

In an aspect of the disclosure, a method, a computer program product, and an apparatus are provided. The apparatus, e.g., base station, determines a plurality of component carriers configured for a user equipment (UE) served by the apparatus. The plurality of component carriers includes a primary component carrier and a secondary component carrier. The primary component carrier may be a time division duplex (TDD) carrier having a same uplink:downlink configuration as a first cell at a neighboring base station, and the secondary component carrier may be a TDD carrier having a different uplink:downlink configuration as a second cell at the neighboring base station. The apparatus exchanges data with the UE according to an effective uplink-downlink subframe partition of the configured component carriers. The effective uplink-downlink subframe partition may be time varying and the apparatus may operate to limit interference due to the different TDD configurations at the serving and neighbor cells.

BRIEF DESCRIPTION OF THE DRAWINGS

FIG. 3A is a diagram illustrating an example of data transmission on the downlink with HARQ.

FIG. 3B is a diagram illustrating an example of data transmission on the uplink with HARQ.

FIG. 10 is a diagram illustrating a design of a process for supporting communication with carrier aggregation.

FIG. 11 is a diagram illustrating a design of a process for communicating with carrier aggregation.

DETAILED DESCRIPTION

Techniques for supporting communication with hybrid carrier aggregation are disclosed herein. Hybrid carrier aggregation refers to operation on multiple carriers of different configurations, as described below. These techniques may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
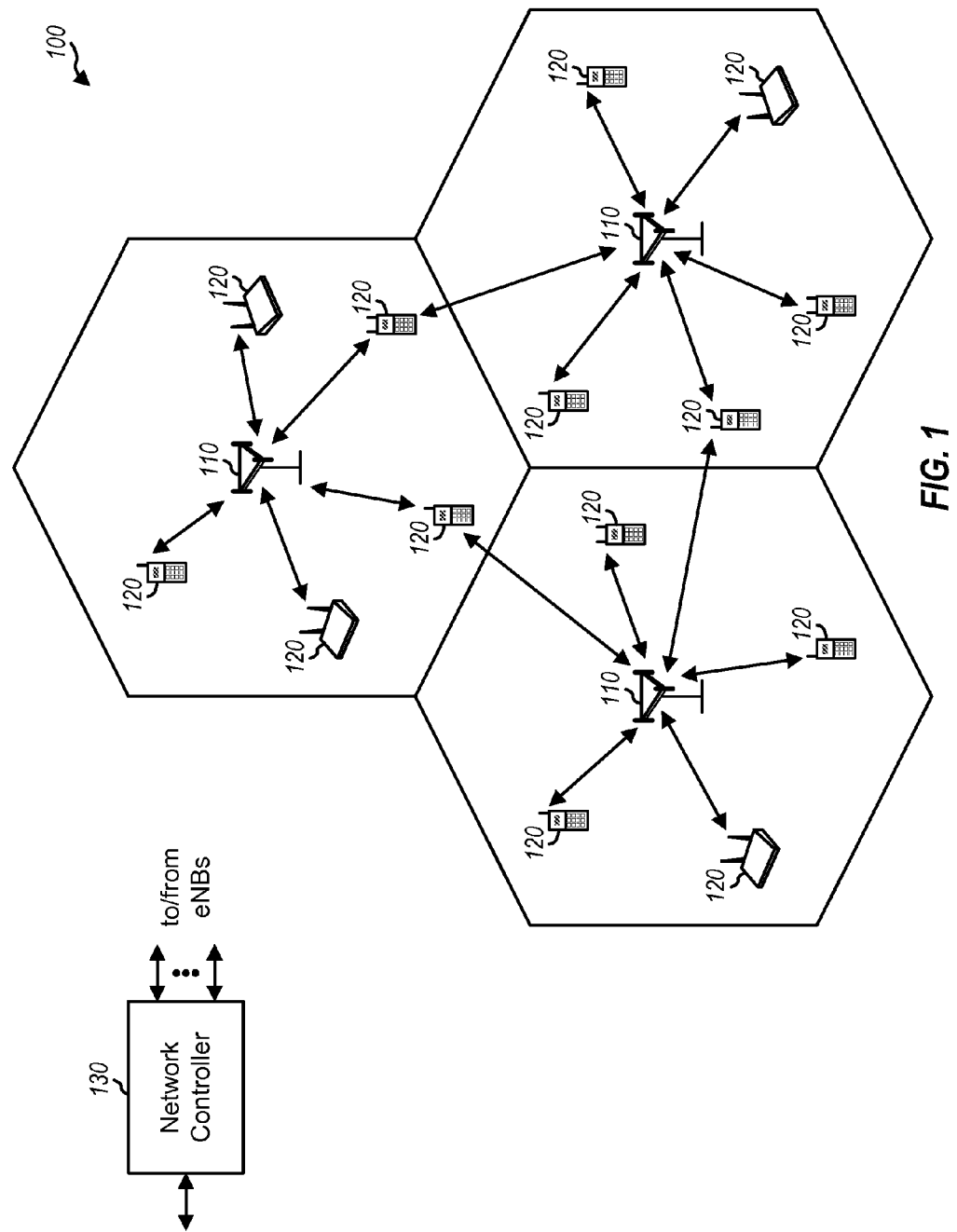
FIG. 1 is a diagram illustrating a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. In general, an eNB may support one or multiple (e.g., three) cells. A cell may also be associated with a carrier for communication.

Wireless network 100 may also include relays. A relay may be an entity that receives a transmission of data from an upstream entity (e.g., an eNB or a UE) and sends a transmission of the data to a downstream entity (e.g., a UE or an eNB). A relay may also be a UE that relays transmissions for other UEs.

A network controller 130 may couple to a set of eNBs and may provide coordination and control for these eNBs. Network controller 130 may communicate with the eNBs via a backhaul. The eNBs may also communicate with one another via the backhaul.

UEs 120 may be dispersed throughout the wireless network, and each UE may be stationary or mobile. A UE may also be referred to as a mobile station, a terminal, an access terminal, a subscriber unit, a station, a node, etc. A UE may be a cellular phone, a Smartphone, a tablet, a personal digital assistant (PDA), a wireless modem, a wireless communication device, a handheld device, a laptop computer, a cordless phone, a wireless local loop (WLL) station, a netbook, a smartbook, etc. A UE may be able to communicate with eNBs, relays, other UEs, etc.

Wireless network 100 may utilize FDD and/or TDD. For FDD, the downlink and uplink may be allocated separate frequency channels. Downlink transmissions may be sent on one frequency channel, and uplink transmissions may be sent on another frequency channel. For TDD, the downlink and uplink may share the same frequency channel, and downlink transmissions and uplink transmissions may be sent on the same frequency channel in different time periods.

Figure 2A:
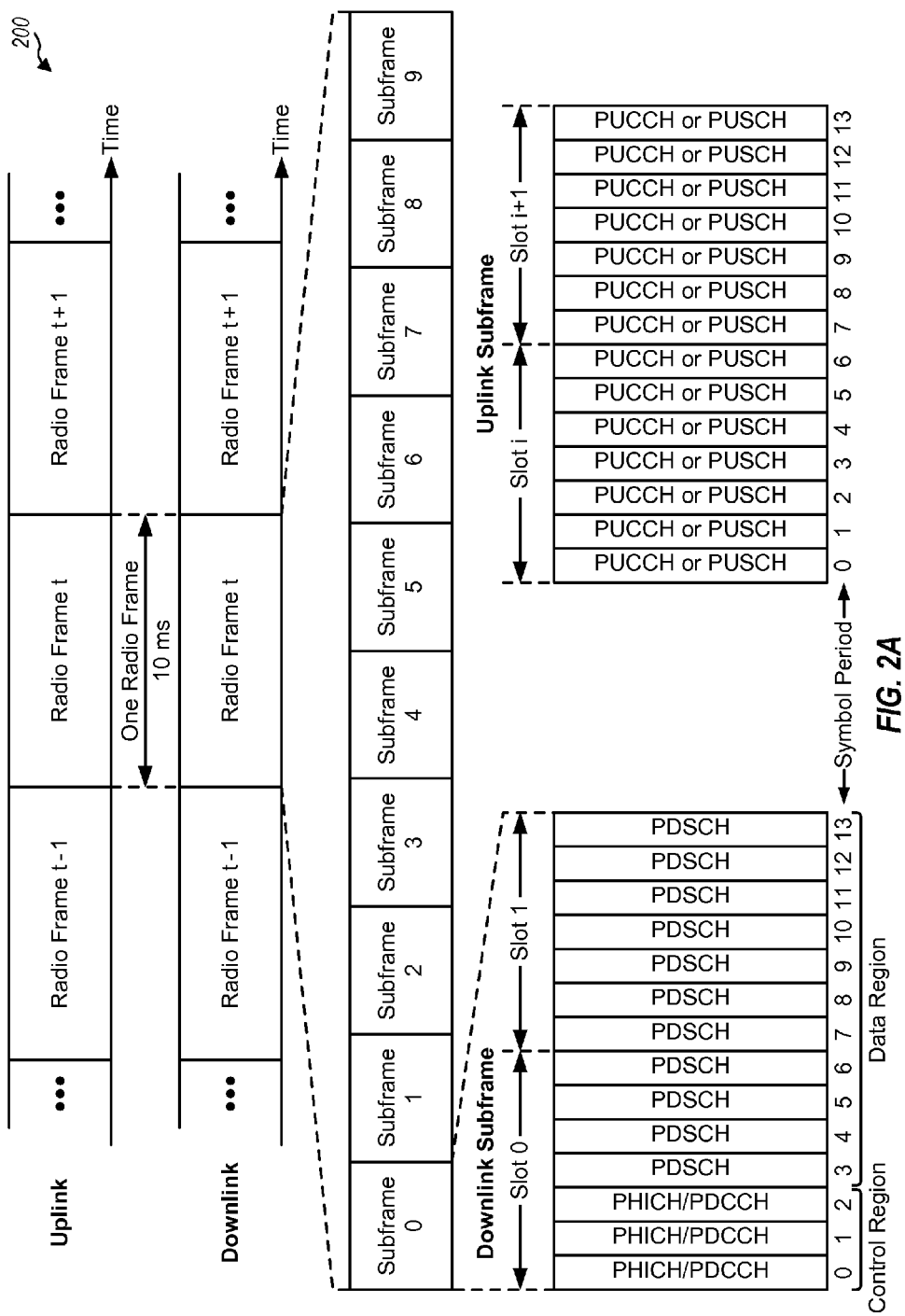
FIG. 2A is a diagram illustrating an exemplary frame structure for FDD in LTE.

FIG. 2A shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2A) or six symbol periods for an extended cyclic prefix. The 2L symbol periods in each subframe may be assigned indices of 0 through 2L−1. For FDD, each subframe for the frequency channel used for the downlink may be referred to as a downlink subframe. Each subframe for the frequency channel used for the uplink may be referred to as an uplink subframe.

A downlink subframe may include a control region and a data region. The control region may include the first Q symbol periods of the downlink subframe, where Q may be equal to 1, 2, 3 or 4 and may change from subframe to subframe. The data region may include the remaining symbol periods of the downlink subframe.

Figure 2B:
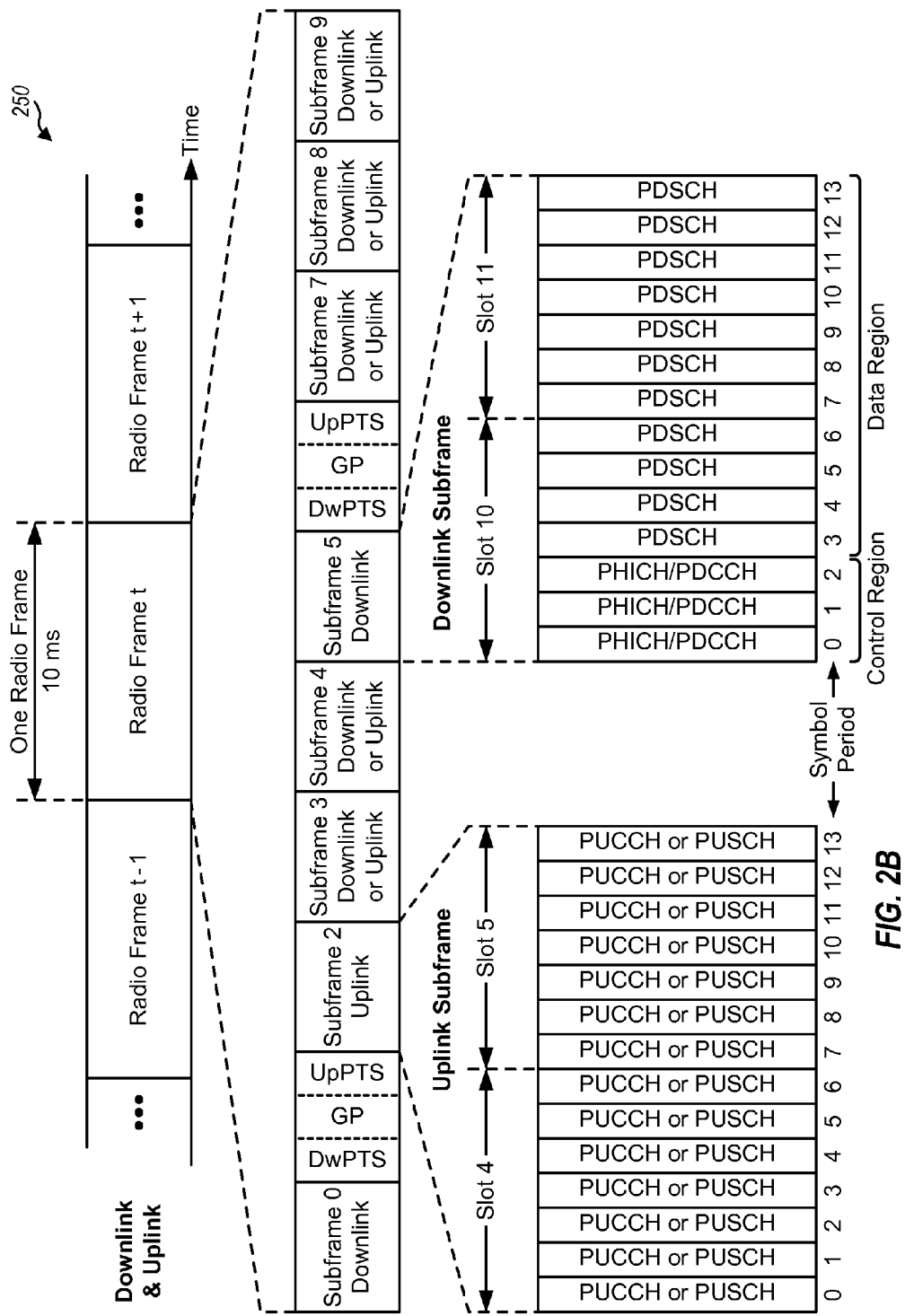
FIG. 2B is a diagram illustrating an exemplary frame structure for TDD in LTE.

FIG. 2B shows an exemplary frame structure 250 for TDD in LTE. The transmission timeline for the downlink and uplink may be partitioned into units of radio frames, and each radio frame may be partitioned into 10 subframes with indices of 0 through 9. LTE supports a number of uplink:downlink configurations for TDD. Subframes 0 and 5 are used for the downlink and subframe 2 is used for the uplink for all uplink:downlink configurations. Subframes 3, 4, 7, 8 and 9 may each be used for the downlink or uplink depending on the uplink:downlink configuration. Subframe 1 includes three special fields composed of a Downlink Pilot Time Slot (DwPTS) used for downlink control channels as well as data transmission, a Guard Period (GP) of no transmission, and an Uplink Pilot Time Slot (UpPTS) used for either a random access channel (RACH) or sounding reference signals (SRS). Subframe 6 may include only the DwPTS, or all three special fields, or a downlink subframe depending on the uplink:downlink configuration. The DwPTS, GP and UpPTS may have different durations for different subframe configurations. For TDD, each subframe used for the downlink may be referred to as a downlink subframe, and each subframe used for the uplink may be referred to as an uplink subframe.

Table 1 lists seven exemplary uplink:downlink configurations available in an LTE network supporting TDD operation. Each uplink:downlink configuration indicates whether each subframe is a downlink subframe (denoted as "D" in Table 1), or an uplink subframe (denoted as "U" in Table 1), or a special subframe (denoted as "S" in Table 1).

TABLE 1

Uplink:downlink configurations for TDD

| Uplink-Downlink Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

For both FDD and TDD, a cell may transmit a Physical Downlink Control Channel (PDCCH), a Physical HARQ Indicator Channel (PHICH), and/or other physical channels in the control region of a downlink subframe. The PDCCH may carry downlink control information (DCI) such as downlink grants, uplink grants, etc. The PHICH may carry acknowledgement/negative acknowledgement (ACK/NACK) for data transmission sent by UEs on the uplink with hybrid automatic repeat request (HARQ). The cell may also transmit a Physical Downlink Shared Channel (PDSCH) and/or other physical channels in the data region of a downlink subframe. The PDSCH may carry data for UEs scheduled for data transmission on the downlink and/or other information.

For both FDD and TDD, a UE may transmit either a Physical Uplink Control Channel (PUCCH) in a control region of an uplink subframe or a Physical Uplink Shared Channel (PUSCH) in a data region of the uplink subframe. The PUCCH may carry uplink control information (UCI) such as channel state information (CSI), ACK/NACK for data transmission sent to the UE on the downlink with HARQ, scheduling request, etc. The PUSCH may carry data and/or uplink control information.

The various channels in LTE are described in 3GPP TS 36.211, entitled "Evolved Universal Terrestrial Radio Access (E-UTRA); Physical Channels and Modulation," which is publicly available.

Wireless network 100 may support data transmission with HARQ in order to improve reliability. For HARQ, a transmitter (e.g., an eNB) may send an initial transmission of a transport block and may send one or more additional transmissions of the transport block, if needed, until the transport block is decoded correctly by a receiver (e.g., a UE), or the maximum number of transmissions of the transport block has occurred, or some other termination condition is encountered. A transport block may also be referred to as a packet, a codeword, etc. After each transmission of the transport block, the receiver may decode all received transmissions of the transport block to attempt to recover the transport block. The receiver may send an ACK if the transport block is decoded correctly or a NACK if the transport block is decoded in error. The transmitter may send another transmission of the transport block if a NACK is received and may terminate transmission of the transport block if an ACK is received.

LTE supports synchronous HARQ on the uplink and asynchronous HARQ on the downlink. For synchronous HARQ, all transmissions of a transport block may be sent in subframes of a single HARQ interlace, which may include evenly spaced subframes. For asynchronous HARQ, each transmission of a transport block may be sent in any subframe.

A specific HARQ timeline may be used for data transmission with HARQ. The HARQ timeline may indicate a specific subframe in which to send a grant, a specific subframe in which to send data based on the grant, and a specific subframe in which to send ACK/NACK for the data transmission.

FIG. 3A shows an example of data transmission on the downlink with HARQ. An eNB may schedule a UE for data transmission on the downlink. The eNB may send a downlink (DL) grant on the PDCCH and a data transmission of one or more transport blocks on the PDSCH to the UE in subframe $t_{D1}$. The UE may receive the downlink grant and may process (e.g., demodulate and decode) the data transmission received on the PDSCH based on the downlink grant. The UE may determine ACK/NACK for each transport block based on whether that transport block is decoded correctly or in error. The UE may send the ACK/NACK for all transport blocks on the PUCCH or PUSCH to the eNB in subframe $t_{D2}$. The eNB may receive the ACK/NACK from the UE. The eNB may terminate transmission of each transport block for which an ACK is received and may send another transmission of each transport block for which a NACK is received.

As shown in FIG. 3A, the HARQ timeline for the downlink may indicate that for a downlink grant sent in downlink subframe $t_{D1}$, data transmission may be sent in the same downlink subframe, and ACK/NACK may be sent $n_{UL\_ACK}$ subframes later in uplink subframe $t_{D2}$, where $t_{D2}=t_{D1}+n_{UL\_ACK}$. In LTE, $n_{UL\_ACK}=4$ for FDD, and $n_{UL\_ACK} \geq 4$ for TDD.

FIG. 3B shows an example of data transmission on the uplink with HARQ. An eNB may schedule a UE for data transmission on the uplink. The eNB may send an uplink (UL) grant on the PDCCH to the UE in subframe $t_{U1}$. The UE may receive the uplink grant and may send a data transmission of one or more transport blocks on the PUSCH in subframe $t_{U2}$. The eNB may process (e.g., demodulate and decode) the data transmission received on the PUSCH based on the uplink grant. The eNB may determine ACK/NACK for each transport block based on whether that transport block is decoded correctly or in error. The eNB may send the ACK/NACK for all transport blocks on the PHICH to the UE in subframe $t_{U3}$. The eNB may schedule the UE for data transmission of each transport block decoded in error by the eNB (not shown in FIG. 3B).

As shown in FIG. 3B, the HARQ timeline for the uplink may indicate that for an uplink grant sent in downlink subframe $t_{U1}$, data transmission may be sent $n_{UL\_Data}$ subframes later in uplink subframe $t_{U2}$, and ACK/NACK may be sent $n_{DL\_ACK}$ subframes later in downlink subframe $t_{U3}$, where $t_{U2}=t_{U1}+n_{UL\_Data}$ and $t_{U3}=t_{U2}+n_{DL\_ACK}$. In LTE, $n_{UL\_Data}=4$ and $n_{DL\_ACK}=4$ for FDD, and $n_{UL\_Data} \geq 4$ and $n_{DL\_ACK} \geq 4$ for TDD. For TDD, $n_{UL\_ACK}$, $n_{UL\_Data}$, and $n_{DL\_ACK}$ may be different for different uplink:downlink configurations and also for different subframes of a given uplink:downlink configuration.

Wireless network 100 may support operation on multiple component carriers (CCs), which may be referred to as carrier aggregation or multi-carrier operation. A UE may be configured with multiple CCs for the downlink and one or more CCs for the uplink for carrier aggregation. For FDD, a CC may comprise one frequency channel for the downlink and another frequency channel for the uplink. For TDD, a CC may comprise a single frequency channel used for both the downlink and uplink. A CC configured for FDD may be referred to as an FDD CC. A CC configured for TDD may be referred to as a TDD CC. An eNB may transmit data and control information on one or more CCs to a UE. The UE may transmit data and control information on one or more CCs to the eNB. Each CC may be operated independently, e.g., with independent control and data transmissions.

Figure 4A:
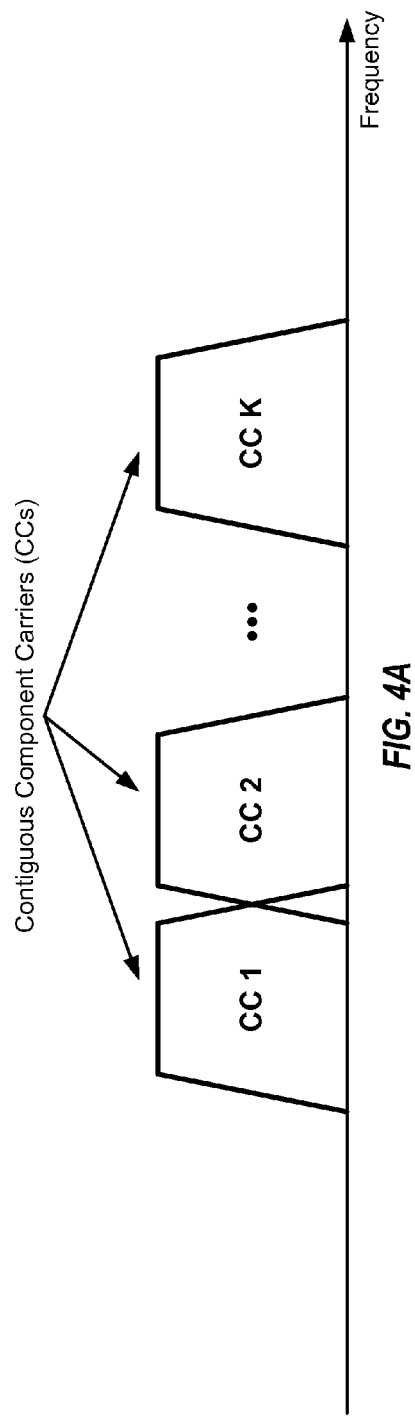
FIG. 4A is a diagram illustrating an example of contiguous carrier aggregation.

FIG. 4A shows an example of contiguous carrier aggregation. K CCs may be available and may be adjacent to each other, where in general K may be any integer value. K may be limited to 5 or less in some LTE Releases. Each CC may have a bandwidth of up to 20 MHz. The overall system bandwidth may be up to 100 MHz when five CCs are supported.

Figure 4B:
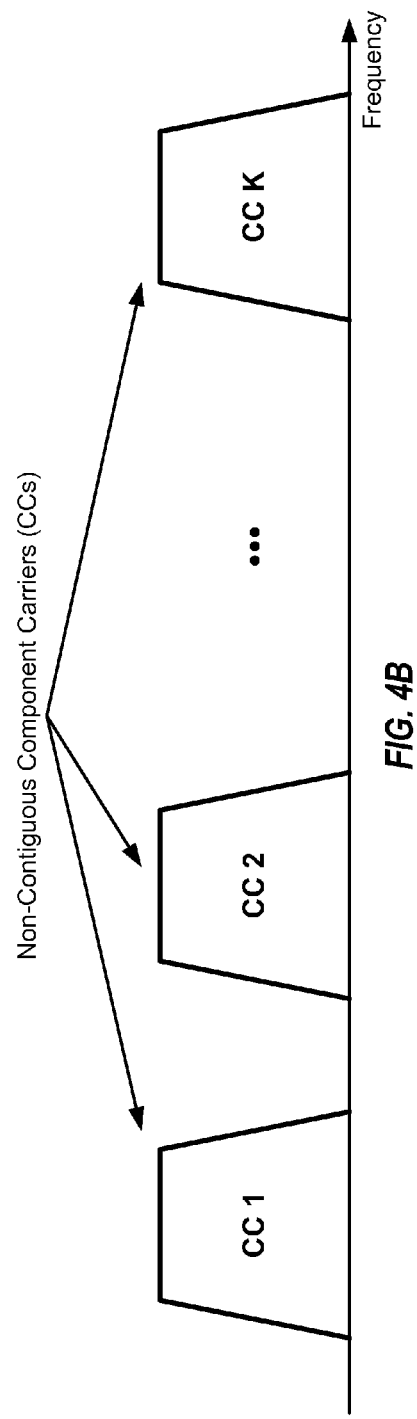
FIG. 4B is a diagram illustrating an example of non-contiguous carrier aggregation.

FIG. 4B shows an example of non-contiguous carrier aggregation. K CCs may be available and may be separate from each other. Each CC may have a bandwidth of up to 20 MHz.

In LTE Release 10, a UE may be configured with up to five CCs for carrier aggregation. Each CC may have a bandwidth of up to 20 MHz and may be backward compatible with LTE Release 8. The UE may thus be configured with up to 100 MHz for up to five CCs. In one design, one CC may be designated as a primary CC (PCC) for the downlink and may be referred to as a downlink PCC. The downlink PCC may carry certain downlink control information such as downlink grants, uplink grants, ACK/NACK, etc. In one design, one CC may be designated as a primary CC for the uplink and may be referred to as an uplink PCC. The uplink PCC may carry certain uplink control information such as ACK/NACK, CSI, etc. In one design, the downlink PCC may be the same as the uplink PCC, and both may be referred to as a PCC. In another design, the downlink PCC may be different from the uplink PCC. For both designs, the PCC for each link may act as an anchor CC for that link. The PCC may carry control information for the PCC and possibly control information for other CCs.

For carrier aggregation, a UE may support operation on one PCC and one or more secondary CCs (SCCs) on the downlink. The UE may also support operation on one PCC and zero or more SCCs on the uplink. An SCC is a CC that is not a PCC. Carrier aggregation may be UE-specific and may be configured separately for each UE. Different UEs may be associated with different numbers of configured CCs, different PCCs, etc.

Each CC may be associated with a particular CC configuration. A CC configuration of a CC may indicate a particular duplexing mode of the CC (e.g., FDD or TDD) and, if TDD, a particular uplink:downlink configuration of the CC.

LTE Release 10 supports carrier aggregation for multiple CCs with the same CC configuration. In particular, all CCs for carrier aggregation are configured for either FDD or TDD, and a mixture of FDD and TDD CCs is not allowed. Furthermore, if the CCs are configured for TDD, then all CCs have the same uplink:downlink configuration, although special subframes may be configured separately for different CCs. Restricting all CCs to have the same FDD or TDD configuration as well as the same uplink:downlink configuration may simplify operation.

LTE Release 11 and/or later may support carrier aggregation for multiple CCs with different CC configurations. For example, an aggregation of FDD and TDD CCs may be supported. As another example, an aggregation of CCs with different uplink:downlink configurations for TDD may be supported. The different uplink:downlink configurations for different CCs may be due to various reasons such as (i) different uplink:downlink configurations for TDD, e.g., as shown in Table 1, (ii) partitioning of downlink subframes and uplink subframes to support operation of relays, (iii) allocation of downlink subframes and uplink subframes to support home eNBs, pico eNBs, etc., and/or (iv) other reasons. Supporting CCs with different uplink:downlink configurations may provide more flexibility in deployment. Each CC may be backward compatible with a single CC in LTE Release 8, 9 or 10 in a single-carrier mode.

In an aspect of the present disclosure, communication on multiple CCs may be supported on a per-subframe basis. These multiple CCs may include one or more FDD CCs and/or one or more TDD CCs and may include TDD CCs of the same or different uplink:downlink configurations. Different subframes may be associated with different UL:DL partitioning. The "UL:DL partitioning" for each subframe may indicate the number of uplink subframes and the number of downlink subframes for all CCs in that subframe. Various attributes of communication such as scheduling, transmission of control information, etc., for each subframe may be dependent on the UL:DL partitioning for that subframe.

Per-subframe operation may be applicable for hybrid carrier aggregation with a combination of FDD and TDD CCs. In general, any number of FDD CCs and any number of TDD CCs may be configured or available. Each TDD CC may be associated with any uplink:downlink configuration. The UL:DL partitioning for each subframe may be dependent on the CC configurations of all CCs.

Figure 5:
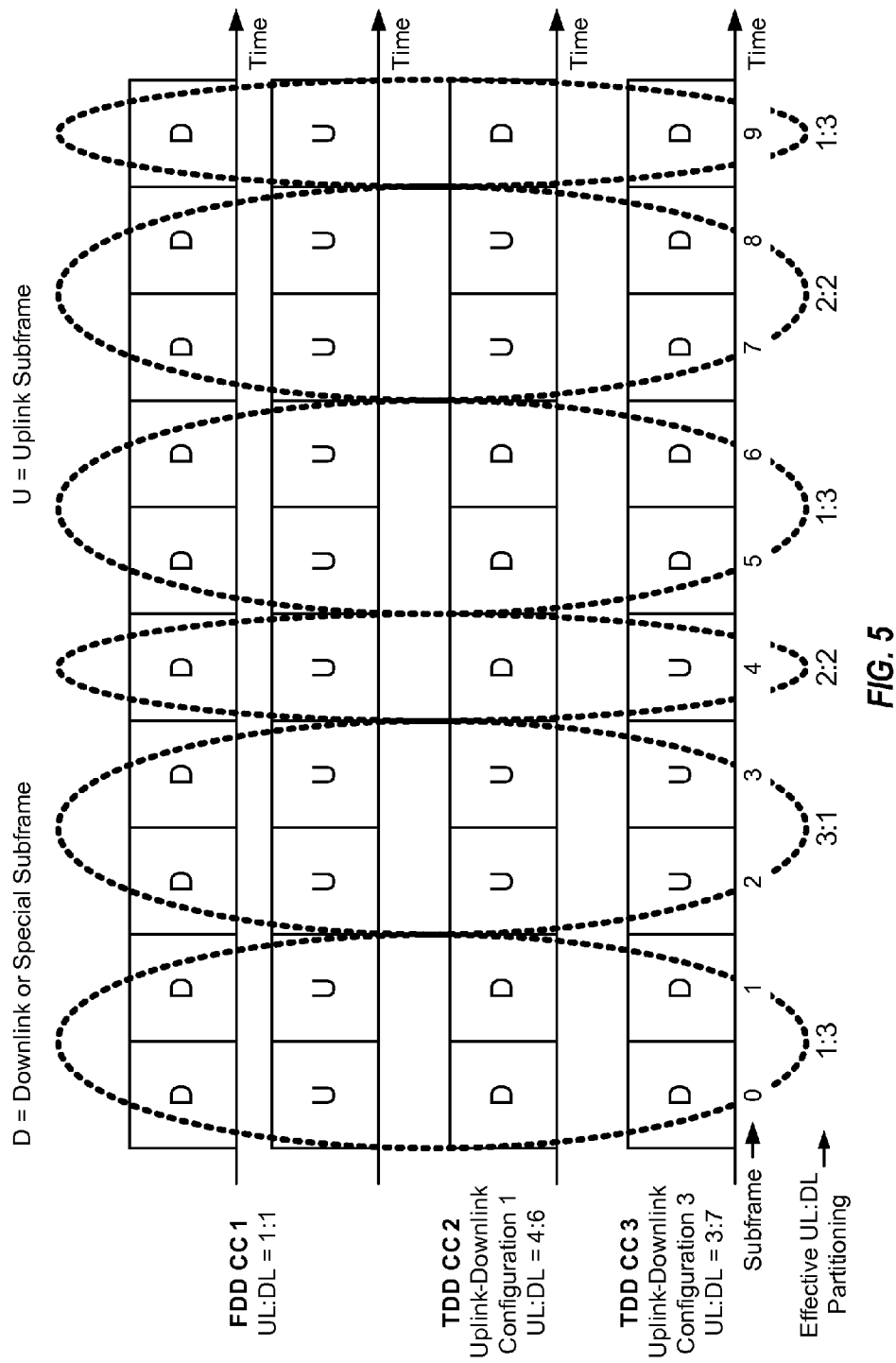
FIG. 5 is a diagram illustrating an example of a deployment of three CCs with different CC configurations.

FIG. 5 shows an exemplary deployment of three CCs with different CC configurations. In this example, CC 1 is configured for FDD and includes two frequency channels. One frequency channel is for the downlink and includes downlink subframes. The other frequency channel is for the uplink and includes uplink subframes. CC 2 is configured for TDD with uplink:downlink configuration 1. Subframes 0, 4, 5 and 9 of CC 2 are downlink subframes, subframes 1 and 6 of CC 2 are special subframes, and remaining subframes 2, 3, 7 and 8 of CC 2 are uplink subframes. CC 3 is configured for TDD with uplink:downlink configuration 3. Subframes 0, 5 and 7-9 of CC 3 are downlink subframes, subframes 1 and 6 of CC 3 are special subframes, and remaining subframes 2-4 of CC 3 are uplink subframes. The downlink subframes and special subframes are denoted as "D" in FIG. 5, and the uplink subframes are denoted as "U" in FIG. 5.

As shown in FIG. 5, FDD CC 1 is associated with a UL:DL partitioning of 1:1, TDD CC 2 is associated with a UL:DL partitioning of 4:6, and TDD CC 3 is associated with a UL:DL partitioning of 3:7. A UL:DL partitioning of U:V means that there are U uplink subframes and V downlink subframes in a given time interval, e.g., a radio frame.

As also shown in FIG. 5, each subframe is associated with an "effective UL:DL partitioning" that indicates a particular number of downlink subframes and a particular number of uplink subframes for all CCs in that subframe. In the example shown in FIG. 5, subframes 0, 1, 5, 6 and 9 are each associated with an effective UL:DL partitioning of 1:3. Subframes 2 and 3 are each associated with an effective UL:DL partitioning of 3:1. Subframes 4, 7 and 8 are each associated with an effective UL:DL partitioning of 2:2.

In one design, UEs may be scheduled for data transmission on the downlink and/or uplink by taking into account the UL:DL partitioning for each subframe. For each subframe, a scheduler may make scheduling decisions based on one or more of the following:

1. Effective UL:DL partitioning for the subframe,
2. UE capability,
3. Amount of data in downlink and uplink buffers per UE,
4. Quality-of-service (QoS) and/or other data requirements of each UE, and
5. Other factors.

The effective UL:DL partitioning for each subframe may be determined based on the CC configurations of all CCs. Different subframes of each radio frame may be associated with different effective UL:DL partitioning, e.g., as shown in FIG. 5. The effective UL:DL partitioning for each subframe may change over time, e.g., semi-statically or dynamically based on various factors such as traffic load at each cell. UEs for which there is more data to send on the downlink may be scheduled in subframes with UL:DL partitioning greater than 1:1, or more downlink subframes than uplink subframes. UEs that have more data to send on the uplink may be scheduled in subframes with UL:DL partitioning less than 1:1, or more uplink subframes than downlink subframes. A scheduler may also look ahead some number of subframes in order to determine whether it is better to schedule a given UE in the current subframe or a future subframe. For example, the UE may have a large amount of data to send on the uplink and may be schedule in the subframe associated with a UL:DL partitioning having the most number of uplink subframes, which may be the current subframe or a future subframe.

UE capability may be classified in various manners. Some UEs may be capable of receiving and transmitting data on a single CC, which may be an FDD CC or a TDD CC. Each of these UEs may be scheduled on a CC configured for that UE. Some other UEs may be capable of receiving data on multiple (N) downlink CCs but may be able to transmit on a single uplink CC, which may be an FDD CC. These UEs may be scheduled whenever there are multiple downlink subframes. Some UEs may be capable of receiving and transmitting data on N downlink CCs and M uplink CCs, where M and N may each be greater than one, and M may or may not be equal to N. These UEs may be scheduled whenever there are multiple downlink subframes or multiple uplink subframes.

The amount of data to send on the downlink to a UE may be quantified by a downlink buffer size, which may be known by a serving cell of the UE. The amount of data to send on the uplink by a UE may be quantified by an uplink buffer size, which may be reported by the UE via a buffer status report (BSR). UEs with large downlink buffer sizes may be scheduled in subframes associated with UL:DL partitioning having more downlink subframes than uplink subframes. UEs with large uplink buffer sizes may be scheduled in subframes associated with UL:DL partitioning having more uplink subframes than downlink subframes.

Data requirements of UEs may be quantified by various parameters such as delay, average throughput, etc. Data with stringent delay requirements (e.g., voice data) may be scheduled in subframes that such that the delay requirements can be met. Data with less stringent or no delay requirements (e.g., Web download data) may be scheduled in subframes that can improve efficiency.

A UE may report its capability to support hybrid carrier aggregation. An eNB may use the information regarding the UE capability to configure and/or activate different CCs for data transmission in order to achieve a desired UL:DL partitioning, or a set of subframes available for scheduling at any particular time, etc. The time-varying aspect of the UL:DL partitioning across subframes may be used to select subframes for scheduling the UE for data transmission and may also be extended to cover configuration of CCs for carrier aggregation, activation/deactivation of configured CCs, etc.

In one design, control information may be sent on an FDD CC to support data transmission on all CCs. The FDD CC includes a downlink subframe and an uplink subframe in each subframe, as shown in FIG. 5. Hence, downlink control information and uplink control information may be sent on the FDD CC in any subframe. In contrast, downlink control information may be sent on a TDD CC in only some subframes, and uplink control information may be sent on the TDD CC in some other subframes.

Figure 6A:
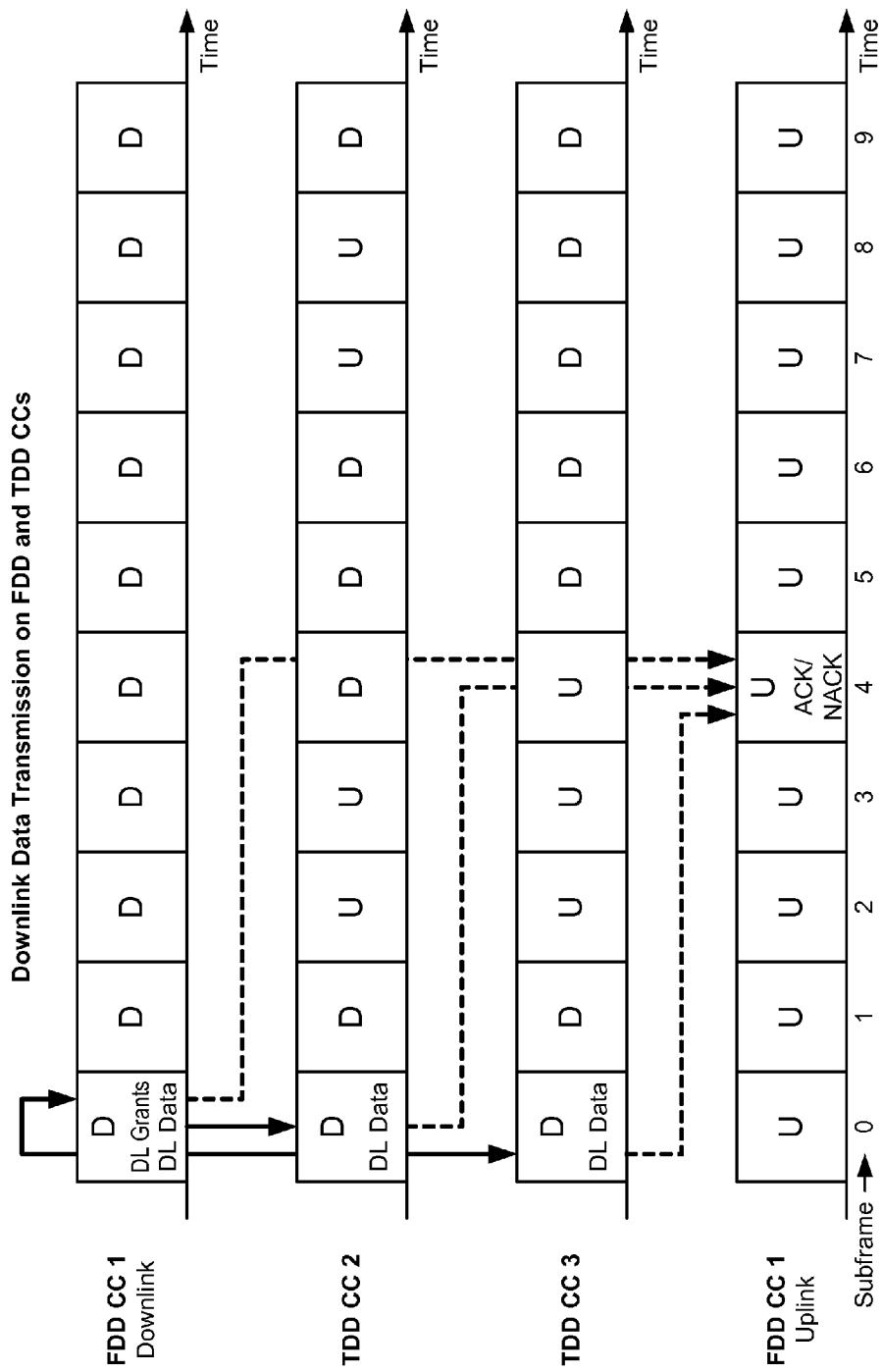
FIG. 6A is a diagram illustrating an example of sending control information on the FDD CC for downlink data transmission on multiple CCs.

FIG. 6A shows an example of UL:DL partitioning for a plurality of component carriers in which the base station sends control information on the FDD CC for downlink data transmission on multiple CCs. In the example shown in FIG. 6A, three CCs are configured for a UE and include FDD CC 1, TDD CC 2 with uplink:downlink configuration 1, and TDD CC 3 with uplink:downlink configuration 3. A single downlink grant or separate downlink grants may be sent on FDD CC 1 in subframe 0 to schedule downlink data transmission on FDD CC 1, TDD CC 2, and TDD CC 3. Data may be sent on the downlink on FDD CC 1, TDD CC 2, and TDD CC 3 in subframe 0. ACK/NACK for downlink data transmissions on the three CCs may be sent on the uplink on FDD CC 1 in subframe 4.

In general, one or more downlink grants may be sent on the FDD CC in any subframe t to schedule data on any CC for which subframe t is a downlink subframe. ACK/NACK for data transmissions on all scheduled CCs may be sent four subframes later on the FDD CC in subframe t+4. The scheduling decision and the CCs available for downlink data transmission in each subframe may be dependent on the effective UL:DL partitioning for that subframe. In one design, the same HARQ timeline may be used for all CCs, which may simplify operation.

A downlink grant may request a UE to report CSI for one or more CCs. The UE may determine CSI for each requested CC and may send the CSI with ACK/NACK on the FDD CC.

Figure 6B:
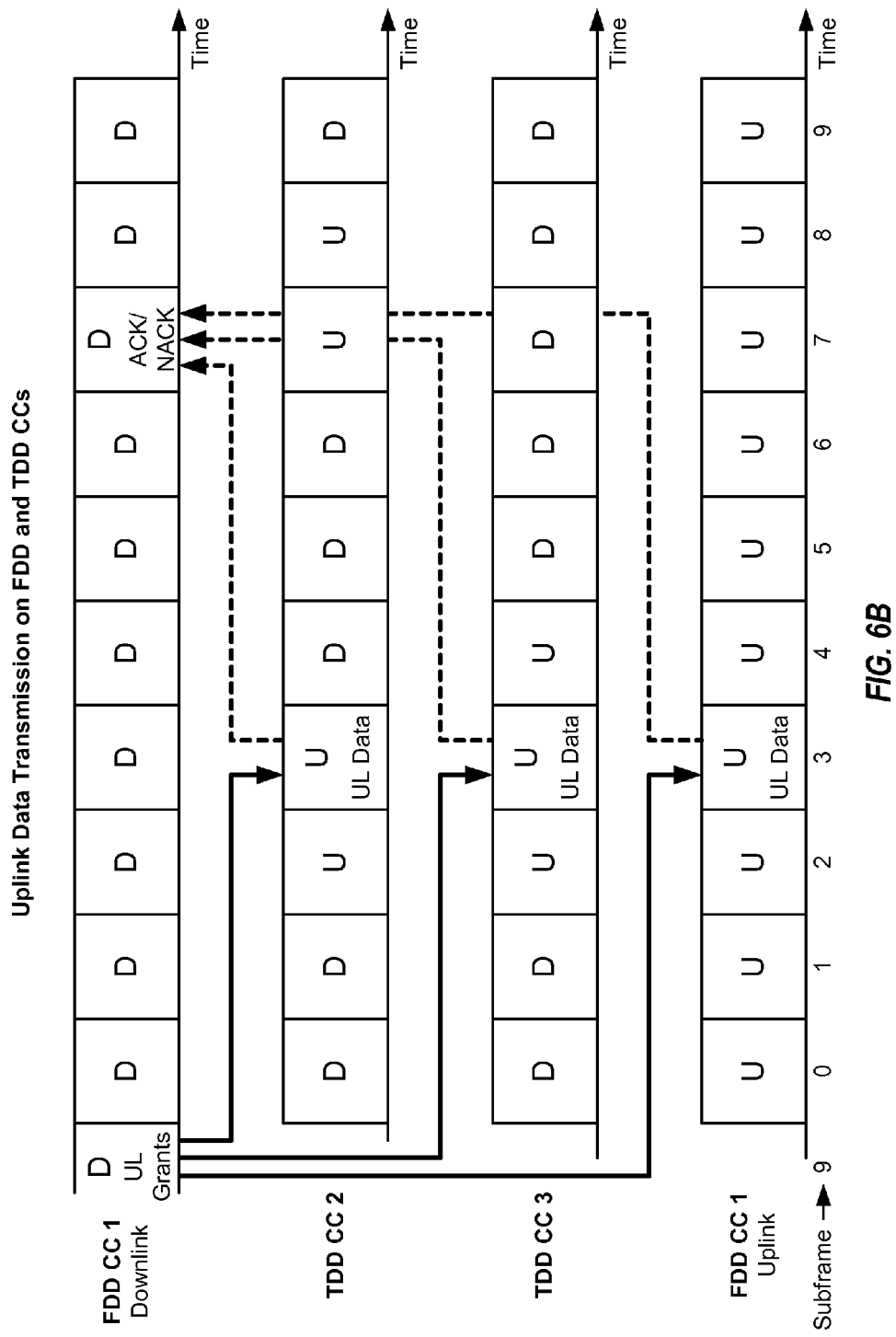
FIG. 6B is a diagram illustrating an example of sending control information on the FDD CC for uplink data transmission on multiple CCs.

FIG. 6B shows an example of sending control information on the FDD CC for uplink data transmission on multiple CCs. In the example shown in FIG. 6B, three CCs are configured for a UE and include FDD CC 1, TDD CC 2 with uplink:downlink configuration 1, and TDD CC 3 with uplink:downlink configuration 3. A single uplink grant or separate uplink grants may be sent on FDD CC 1 in subframe 9 of a preceding radio frame to schedule uplink data transmission on FDD CC 1, TDD CC 2, and TDD CC 3 in subframe 3 of the current radio frame. Data may be sent on the uplink on FDD CC 1, TDD CC 2, and TDD CC 3 in subframe 3. ACK/NACK for uplink data transmissions on the three CCs may be sent on the downlink on FDD CC 1 in subframe 7.

The base station may send one or more uplink grants based on the effective subframe partition for the hybrid-CA capable UE. For example, an UL grant may be sent on the FDD CC in any subframe t to schedule data on any CC for which, based on the effective subframe partition, subframe t+4 is an uplink subframe. ACK/NACK for data transmissions on all scheduled CCs may be sent four subframes later on the FDD CC in subframe t+8. Similarly, when making its scheduling decisions, the base station may send UL grants in each subframe t according to the effective UL:DL partitioning for subframe t+4. In one design, the same HARQ timeline may be used for all CCs, which may simplify operation.

Table 2 shows the location (or which CC) in which different types of control information are sent for the designs shown in FIGS. 6A and 6B. Downlink control information such as downlink grants, uplink grants, and ACK/NACK for data transmission on an FDD CC may be sent on the FDD CC. Downlink control information for data transmission on a TDD CC may also be sent on the FDD CC. Uplink control information, such as ACK/NACK and CSI for downlink data transmission on an FDD CC, may be sent on the FDD CC. Uplink control information for downlink data transmission on a TDD CC may also be sent on the FDD CC.

TABLE 2

|  | FDD CC | TDD CC |
| --- | --- | --- |
| DL grant location(s) | FDD downlink | FDD downlink; downlink subframe |
| DL control location(s) | FDD downlink | FDD downlink; downlink subframe |

TABLE 2-continued

| | FDD CC | TDD CC |
|---|---|---|
| UL grant location(s) | FDD downlink | FDD downlink; downlink subframe |
| UL control location(s) | FDD uplink | FDD uplink; uplink subframe |

In another design, control information may be sent on different CCs depending on the availability of downlink and uplink subframes. For example, uplink control information to support data transmission on a given CC may be sent on that CC if an uplink subframe is available or may be sent on an FDD CC otherwise.

Figure 6C:
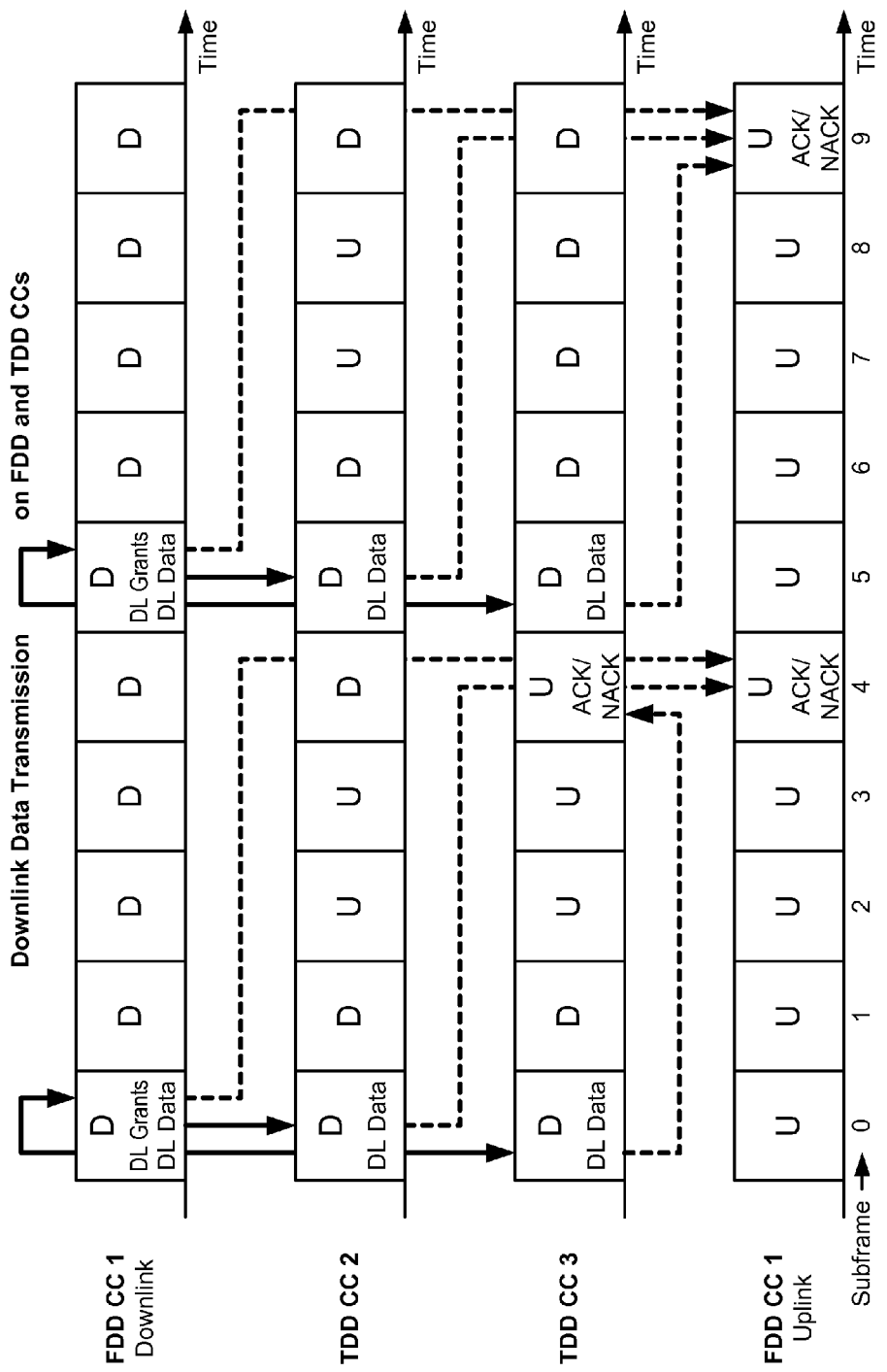
FIG. 6C is a diagram illustrating an example of sending control information on different CCs depending on the effective UL:DL partitioning for each subframe.

FIG. 6C shows an example of sending control information on different CCs depending on the effective UL:DL partitioning for each subframe. In the example shown in FIG. 6C, three CCs are configured for a UE and include FDD CC 1, TDD CC 2 with uplink:downlink configuration 1, and TDD CC 3 with uplink:downlink configuration 3. The base station may send a single downlink grant or separate downlink grants on FDD CC 1 in subframe 0 to schedule downlink data transmission on FDD CC 1, TDD CC 2, and TDD CC 3 in subframe 0. Data may be sent on the downlink on FDD CC 1, TDD CC 2, and TDD CC 3 in subframe 0. ACK/NACK for the downlink data transmission on FDD CC 1 may be sent on the uplink on FDD CC 1 in subframe 4. ACK/NACK for the downlink data transmission on TDD CC 2 may also be sent on FDD CC 1 in subframe 4. Since subframe 4 is a downlink subframe for TDD CC 2, the UE cannot send ACK/NACK on TDD CC 2 in subframe 4. ACK/NACK for the downlink data transmission on TDD CC 3 may be sent on TDD CC 3 in subframe 4, which is an uplink subframe for TDD CC 3.

Continuing with the example, the base station may send a single downlink grant or separate downlink grants on FDD CC 1 in subframe 5 to schedule downlink data transmission on FDD CC 1, TDD CC 2, and TDD CC 3 in subframe 5. Data may be sent on the downlink on all three CCs in subframe 5. ACK/NACK for the downlink data transmissions on all three CCs may be sent on FDD CC 1 in subframe 9. Since subframe 9 is a downlink subframe for both TDD CCs 2 and 3, the UE cannot send ACK/NACK on TDD CC 2 or TDD CC 3 in subframe 9.

In one design, a UE may send uplink control information for a TDD CC on a preferred TDD CC in a given subframe if that subframe is an uplink subframe for the TDD CC. If the preferred TDD CC has a DL subframe, the UE may instead send the uplink control information on a FDD CC in a given subframe. A UE can send uplink control information in an uplink subframe but not a downlink subframe. This design may ensure that uplink control information can be sent on a suitable or preferred CC in a given subframe depending on the UL:DL partitioning for that subframe.

Per-subframe operation may also be applicable for hybrid carrier aggregation with a combination of TDD CCs having different uplink:downlink configurations. In general, any number of TDD CCs may be configured or available. Each TDD CC may be associated with any uplink:downlink configuration. The UL:DL partitioning for each subframe may be dependent on the CC configurations of all CCs.

Figure 7:
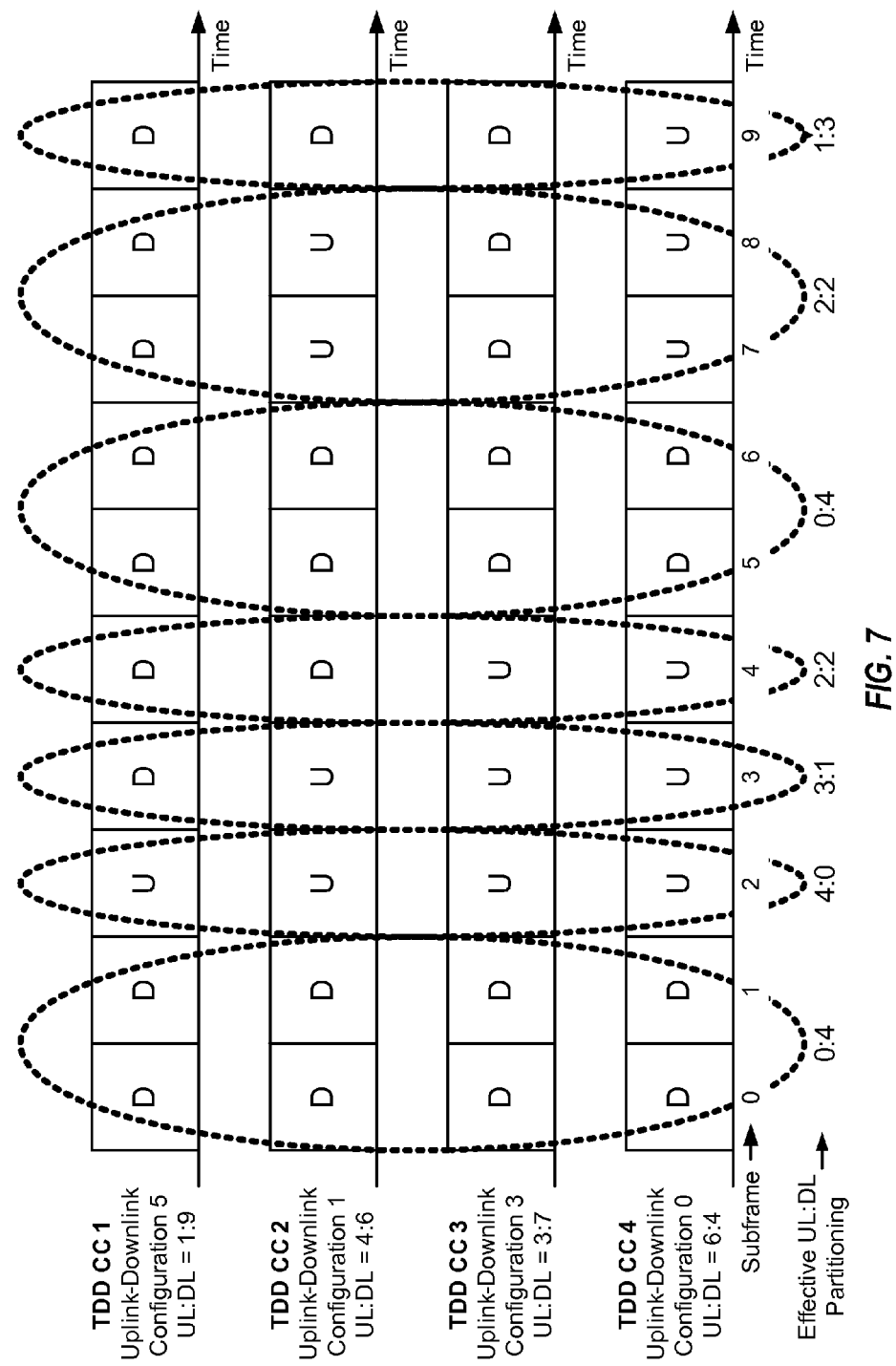
FIG. 7 is a diagram illustrating an exemplary deployment of four TDD CCs with different uplink:downlink configurations.

FIG. 7 shows an exemplary deployment of four TDD CCs, each with a different uplink:downlink configuration. In this example, TDD CC 1 has uplink:downlink configuration 5 and includes downlink subframes 0, 3-5 and 7-9, uplink subframe 2, and special subframes 1 and 6. TDD CC 2 has uplink:downlink configuration 1 and includes downlink subframes 0, 4, 5 and 9, uplink subframes 2, 3, 7 and 9, and special subframes 1 and 6. TDD CC 3 has uplink:downlink configuration 3 and includes downlink subframes 0, 5 and 7-9, uplink subframes 2-4, and special subframes 1 and 6. TDD CC 4 has uplink:downlink configuration 0 and includes downlink subframes 0 and 5, uplink subframes 2-4 and 7-9, and special subframes 1 and 6.

As shown in FIG. 7, TDD CC 1 is associated with a UL:DL partitioning of 1:9, TDD CC 2 is associated with a UL:DL partitioning of 4:6, TDD CC 3 is associated with a UL:DL partitioning of 3:7, and TDD CC 4 is associated with a UL:DL partitioning of 6:4. As also shown in FIG. 7, each subframe is associated with an effective UL:DL partitioning that indicates a particular number of uplink subframes and a particular number of downlink subframes for all CCs in that subframe. In the example shown in FIG. 7, subframes 0, 1, 5 and 6 are each associated with an effective UL:DL partitioning of 0:4. Subframe 2 is associated with an effective UL:DL partitioning of 4:0. Subframe 3 is associated with an effective UL:DL partitioning of 3:1. Subframes 4, 7 and 8 are each associated with a UL:DL partitioning of 2:2. Subframe 9 is associated with an effective UL:DL partitioning of 1:3.

Different cells may utilize different uplink:downlink configurations for a given TDD CC. This may result in some UEs in a given cell observing strong interference from other UEs in other cells.

Figure 8:
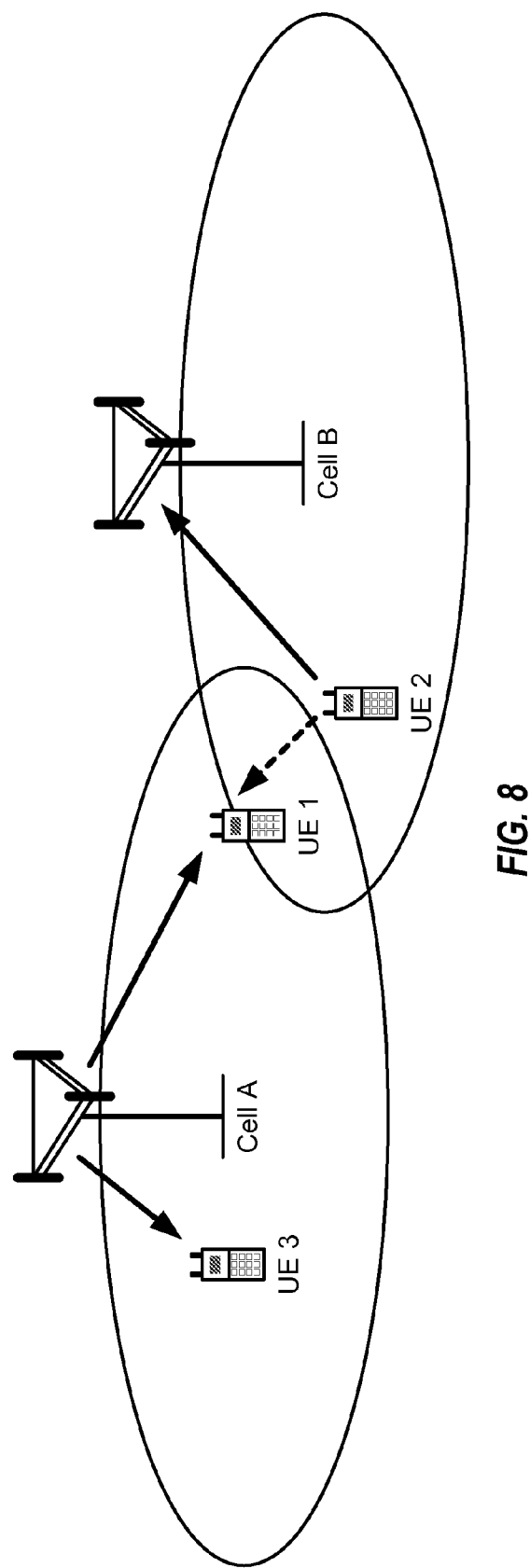
FIG. 8 is a diagram illustrating an example of communication between two cells and two UEs with inter-cell interference due to different uplink:downlink configurations for a TDD CC.

FIG. 8 shows an example of communication between two cells and two UEs with inter-cell interference due to different uplink:downlink configurations for a TDD CC. Cells A and B may operate on the same TDD CC but may have different uplink:downlink configurations for this TDD CC. A given subframe t may correspond to a downlink subframe for cell A and an uplink subframe for cell B. Cell A may transmit data and/or control information to UE 1 on the TDD CC in subframe t, which is a downlink subframe for cell A. UE 2 may transmit data and/or control information to cell B on the TDD CC in subframe t, which is an uplink subframe for cell B. UE 1 may be located relatively close to UE 2 and may observe strong interference from UE 2. The strong interference from UE 2 may impact the ability of UE 1 to receive the downlink transmission from cell A.

In another aspect of the present disclosure, neighbor cells may utilize the same uplink:downlink configuration for a PCC in order to mitigate inter-cell interference on the PCC. This may ensure that the neighbor cells have the same downlink subframes and the same uplink subframes on the PCC. Hence, control information sent on the downlink by one cell on the PCC would not observe interference from uplink transmissions sent by UEs in other cells. However, each cell may also support one or more secondary CCs having different TDD configurations. The present disclosure provides techniques for intelligent scheduling and coordination to reduce the impact of utilizing different TDD configurations at neighboring cells.

Figure 9:
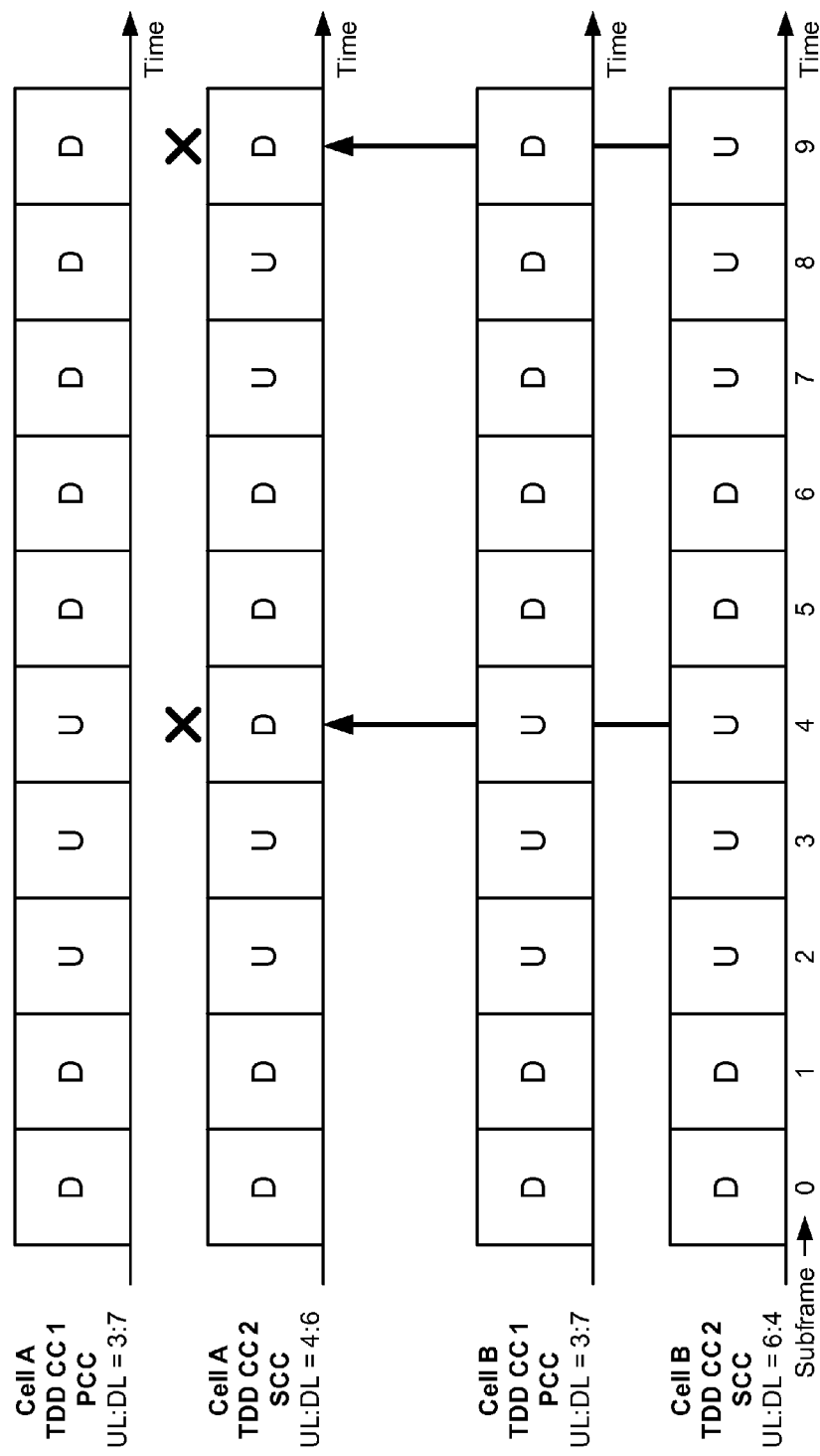
FIG. 9 is a diagram illustrating an exemplary deployment of two TDD CCs with the same uplink:downlink configuration for the PCC.

FIG. 9 shows an exemplary deployment of two TDD CCs with the same uplink:downlink configuration for the PCC. In this example, cell A and cell B both operate on TDD CC 1 and TDD CC 2. Both cells A and B utilize the same uplink:downlink configuration 3 for TDD CC 1, which is the PCC. Cells A and B utilize different uplink:downlink configurations 1 and 0, respectively, for TDD CC 2, which is an SCC. As shown in FIG. 9, TDD CC 1 is associated with a UL:DL partitioning of 3:7 for both cells A and B. TDD CC 2 is associated with a UL:DL partitioning of 4:6 for cell A and a UL:DL partitioning of 6:4 for cell B due to the different uplink:downlink configurations for TDD CC 2 for the two cells. For each cell, the effective UL:DL partitioning for each subframe is dependent on the uplink:downlink configurations for the two TDD CCs for the cell. For each cell, the effective UL:DL partitioning may change across subframes, e.g., as shown in FIG. 9.

Each cell may transmit data and/or downlink control information on TDD CC 1 (the PCC) in each downlink subframe. Since the same uplink:downlink configuration is used for TDD CC 1 by the two cells, the UEs in each cell can receive data and/or downlink control information on TDD CC 1 in each downlink subframe without observing interference from UEs in the other cell.

Different uplink:downlink configurations may be used for TDD CC 2 by the two cells. Hence, a UE receiving a downlink transmission of data and/or downlink control information from one cell on TDD CC 2 in a downlink subframe (e.g., from cell A in downlink subframe 4) may observe interference from UEs transmitting on TDD CC 2 in an uplink subframe to the other cell (e.g., from UEs transmitting in uplink subframe 4 to cell B). UEs located near the coverage edge of a cell may observe stronger inter-cell interference than UEs located away from the coverage edge. To mitigate the effects of inter-cell interference, the base station may schedule UEs located near the coverage edge of a cell and observing strong inter-cell interference (e.g., UE 2 in FIG. 8) on TDD CC(s) (e.g., the PCC) having the same uplink:downlink configuration as that of the neighbor cells. UEs located away from the coverage edge of a cell (e.g., UE 3 in FIG. 8) may be scheduled on TDD CC(s) having different uplink:downlink configurations than those of the neighbor cells.

The base station may determine inter-cell interference in various manners. In one design, strong inter-cell interference may be determined based on a measurement report sent by a UE. The report may include received signal strengths of cells detected by the UE, e.g., cells with received signal strength exceeding a threshold. The UE may be deemed to observe strong interference from a neighbor cell if the received signal strength for the neighbor cell exceeds a high threshold. In another design, strong inter-cell interference may be determined based on interference measurements made by a cell of UEs not served by the cell. Strong inter-cell interference may also be determined in other manners.

In one design, the neighboring base stations may cooperate to reduce interference arising from the different TDD configurations. Inter-cell interference coordination (ICIC) may be performed for only the PCC to enable reliable reception of downlink control information on the PCC. For example, a first neighboring base station may send a message to a second neighboring base station indicating that the first base station has changed its TDD configurations. In response, the second neighboring base station may synchronize its TDD configuration to correspond to that of the first base station. Inter-cell interference coordination may not be performed for SCCs in order to provide each cell the flexibility to select a suitable uplink:downlink configuration for each SCC based on the traffic load observed by the cell. In another design, inter-cell interference coordination may be performed for the PCC and one or more additional CCs. Inter-cell interference coordination may be dynamically performed between neighbor cells as necessary.

In one design, the uplink:downlink configuration for each TDD CC may be semi-static. In another design, the uplink: downlink configuration for each TDD CC may be dynamically changed. The uplink:downlink configuration for the PCC may be changed with coordination between neighbor cells such that these cells use the same uplink:downlink configuration for the PCC and can mitigate inter-cell interference. The uplink:downlink configuration for each SCC may be changed autonomously by each cell without informing other cells. For example, the UL:DL configuration may change based on an interference report or based on the traffic requirement, i.e., the number of DL and UL subframes needed. Alternatively, a cell may coordinate with other cells prior to changing an uplink:downlink configuration of an SCC for the cell in order to mitigate interference and improve performance.

Inter-cell interference coordination may not be performed for SCCs. Hence, transmissions sent on the SCCs to UEs may observe inter-cell interference. For a given cell A, downlink subframes of an SCC that may be subject to interference from UEs in another cell B may be identified and may be referred to as I subframes. The I subframes may be a subset of the downlink subframes of the SCC. UEs in cell A that can detect cell B on the downlink (e.g., UEs with received power for cell B above a threshold level) may be referred to as victim UEs. These UEs may be victimized by inter-cell interference if scheduled on the SCC in the I subframes. UEs in cell A that cannot detect cell B on the downlink (e.g., UEs with received power for cell B below the threshold level) may be referred to as center UEs. The center UEs may still be victimized by inter-cell interference due to transmission from UEs located at the edge of coverage in cell B.

A scheduler may schedule center UEs and victim UEs in different manners. In one design, unconstrained scheduling may be used for the PCC. Center UEs as well as victim UEs may be scheduled in all downlink subframes of the PCC. Constrained scheduling may be used for the SCC. In one design, center UEs may send separate channel state information (CSI) reports, such as channel quality indicator (CQI) reports for I subframes and non-I subframes of the SCC— "unclean" CSI reports for I subframes and "clean" CSI reports for non-I subframes. Center UEs may be scheduled in I subframes based on their unclean CSI reports and may be scheduled in non-I subframes based on their clean CSI reports. In one design, victim UEs may send CSI reports for non-I subframes and may be scheduled only in non-I subframes based on their CSI reports. Center UEs and victim UEs may also be scheduled in other manners on the SCC.

In one design, UEs may be scheduled for data transmission on the downlink and/or uplink by taking into account the UL:DL partitioning for each subframe. For each subframe, a scheduler may make scheduling decisions based on one or more of the factors listed above including effective UL:DL partitioning for the subframe, UE capability, amount of data in downlink and uplink buffers per UE, QoS and/or other data requirements of each UE, etc.

In one design, control information may be sent on downlink PCC and uplink PCC to support data transmission on all CCs. Control information may be sent based on the HARQ timeline for the PCC. This may ensure that downlink control information can be sent in downlink subframes of the downlink PCC, and uplink control information can be sent in uplink subframes of the uplink PCC. In another design, control information may be sent on different CCs depending on the availability of downlink and uplink subframes. For example, uplink control information to support data transmission on a given TDD CC may be sent on that TDD CC if an uplink subframe is available or may be sent on the uplink PCC otherwise.

The techniques described herein for supporting hybrid carrier aggregation with a combination of FDD and TDD CCs or a combination of TDD CCs with different uplink:downlink configurations may have various advantages. First, the techniques may allow network operators to better utilize their FDD and/or TDD spectrum. The techniques support partitioning of the available FDD and/or TDD spectrum between the downlink and uplink with fine granularity on a per-subframe basis. Furthermore, the techniques support dynamic changes to the CC configurations of the CCs to better match traffic load on the downlink and uplink, which may vary in time and/or geography. A wide range of effective UL:DL partitioning may be obtained for all CCs across subframes, e.g., as shown in FIGS. 5 and 7.

Second, the techniques described herein enable each CC to support different types of UEs. Each CC may support any combination of UEs supporting only FDD, UEs supporting only TDD, and UEs supporting both FDD and TDD. A UE supporting only FDD may operate on one or more FDD CCs. A UE supporting only TDD may operate on one or more TDD CCs. A UE supporting both FDD and TDD may operate on one or more FDD CCs and/or one or more TDD CCs. This UE may support different uplink:downlink configurations across TDD CCs and may aggregate downlink and uplink subframes across multiple FDD and/or TDD CCs.

Third, the techniques described herein may support flexible transmission of control information to support operation on the FDD and TDD CCs. Downlink control information such as downlink grants, uplink grants, and ACK/NACK may be sent on an FDD CC (e.g., as shown in FIG. 6A) and/or on a TDD CC (e.g., if an FDD CC is not available). Uplink control information such as ACK/NACK and CSI may be sent on the FDD CC (e.g., as shown in FIG. 6B) and/or in uplink subframes of a TDD CC (e.g., as shown in FIG. 6C). Sending downlink control information and uplink control information on the FDD CC may allow the same HARQ timeline to be used for all CCs, which may greatly simplify operation.

FIG. 10 shows a process 1000 for supporting communication with carrier aggregation. The process 1000 may be performed by a cell/base station (as described below) or by some other entity. The base station may determine a plurality of CCs configured for a UE (block 1012). The plurality of CCs may include an FDD CC and at least one TDD CC. The base station may send control information on the FDD CC to the UE based on UE capability (block 1014). The base station may select the FDD CC for sending the control information based on the UE capability. Alternatively or additionally, the base station may send the control information in a particular manner based on the UE capability. The base station may obtain the UE capability based on signaling exchanged with the UE. The base station may exchange (e.g., send and/or receive) data on at least one of the plurality of CCs with the UE (block 1016).

In one design, scheduling may be performed based on an effective UL:DL partitioning for each subframe. The effective UL:DL partitioning for each of a plurality of subframes may be determined based on an uplink:downlink configuration for each of the at least one TDD CC. The at least one TDD CC may have a configurable uplink:downlink configuration, and the effective UL:DL partitioning for each subframe may change over time. A subframe in which to schedule the UE for data transmission may be selected based on the effective UL:DL partitioning for each of the plurality of subframes. The subframe in which to schedule the UE for data transmission may be selected based further on the capability of the UE, the amount of data to send to or by the UE, data requirements of the UE, and/or other factors.

The control information may include at least one downlink grant. For block 1016, the base station may send data on at least one CC to the UE based on the at least one downlink grant. The control information may include at least one uplink grant. For block 1016, the base station may receive data sent on at least one CC by the UE based on the at least one uplink grant. In one design, data may be sent on each of the plurality of CCs based on an HARQ timeline that is applicable for all of the CCs.

With reference to FIG. 6A, in one design, a UE may send uplink ACK/NACK on the FDD CC, for example FCC CC 1 Uplink, in response to downlink data sent by the base station on at least one CC. The at least one CC may be a TDD CC, for example TDD CC 2 or TDD CC 3, or an FDD CC, for example FCC CC 1. The base station may receive ACK/NACK sent on the FDD CC by the UE, and the ACK/NACK may be for data sent on the at least one CC by the base station. With reference to FIG. 6C, in another design, a UE may send uplink ACK/NACK on a TDD CC, for example, TDD CC 3, in response to downlink data sent on the same TDD CC. The base station may receive ACK/NACK sent on the TDD CC by the UE, and the ACK/NACK may be for data sent on the TDD CC to the UE. With reference to FIG. 6B, in yet another design, a base station may send downlink ACK/NACK on the FDD CC in response to uplink data sent by a UE on at least one TDD CC, for example TDD CC 2 or TDD CC 3. The base station may send ACK/NACK on the FDD CC to the UE, and the ACK/NACK may be for data received on the at least one CC from the UE. With continued reference to FIG. 6B, in yet another design, a base station may send a downlink ACK/NACK on the FDD CC for uplink data sent on a FDD CC, for example FCC CC 1. The base station may send ACK/NACK on the FDD CC to the UE, and the ACK/NACK may be for data received on the TDD CC from the UE.

FIG. 11 shows a process 1100 for communicating with carrier aggregation. The process 1100 may be performed by a UE (as described below) or by some other entity. The UE may determine a plurality of CCs configured for the UE (block 1112). The plurality of CCs may include an FDD CC and at least one TDD CC. The UE may receive control information sent on the FDD CC to the UE based on the UE capability (block 1114). The UE may exchange data on at least one of the plurality of CCs (block 1116).

The control information may include at least one downlink grant. For block 1116, the UE may receive data sent on at least one CC to the UE based on the at least one downlink grant. The control information may include at least one uplink grant. For block 1116, the UE may send data on at least one CC based on the at least one uplink grant.

With reference to FIG. 6A, in one design, the UE may send uplink ACK/NACK on the FDD CC for downlink data sent by a base station on at least one CC. The at least one CC may be a TDD CC, for example TDD CC 2 or TDD CC 3, or an FDD CC, for example FCC CC 1. The UE may send ACK/NACK on the FDD CC, and the ACK/NACK may be for data received on the at least one CC by the UE. With reference to FIG. 6C, in another design, the UE may send uplink ACK/NACK on a TDD CC, for example TDD CC 2 or TDD CC 3, for downlink data sent by the base station on the same TDD CC. The UE may send ACK/NACK on the TDD CC in a designated subframe. The ACK/NACK may be for data received on the same TDD CC by the UE, with the designated subframe being an uplink subframe for the TDD CC. With reference to FIG. 6B, in yet another design, the base station may send downlink ACK/NACK on the FDD CC for uplink data sent by the UE on at least one FDD CC. The UE may receive ACK/NACK sent on the FDD CC, and the ACK/NACK may be for data sent on the at least one FDD CC by the UE. With continued reference to FIG. 6B, in yet another design, the base station may send downlink ACK/NACK on the FDD CC for uplink data by the UE on a TDD CC, for example TDD CC 2 or TDD CC 3. The UE may receive ACK/NACK sent on the FDD CC, and the ACK/NACK may be for data sent on the TDD CC by the UE.

Figures 12, 13:
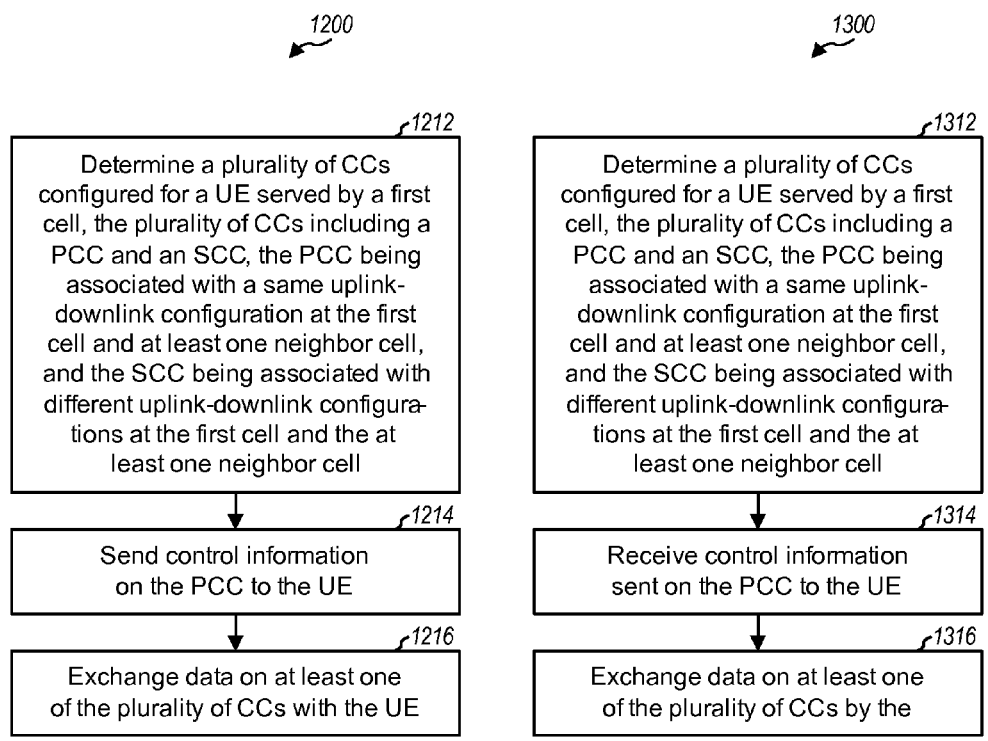
FIG. 12 is a diagram illustrating a design of a process for supporting communication with carrier aggregation.
FIG. 13 is a diagram illustrating a design of a process 1300 for communicating with carrier aggregation.

FIG. 12 shows a process 1200 for supporting communication with carrier aggregation. The process 1200 may be performed by a base station (as described below) or by some other entity. The base station may determine a plurality of CCs configured for a UE served by the base station (block 1212). The plurality of CCs may include a PCC and an SCC. The PCC may be associated with the same uplink:downlink configuration at a first cell and at least one neighbor cell. The SCC may be associated with different uplink:downlink configurations at the first cell and the at least one neighbor cell. The base station may send control information on the PCC to the UE (block 1214). The base station may exchange data on at least one of the plurality of CCs with the UE (block 1216).

In one design, the PCC may have a configurable uplink:downlink configuration. Changes to the uplink:downlink configuration of the PCC may be synchronized at the first cell and the at least one neighbor cell. In one design, the SCC may have a configurable uplink:downlink configuration at the first cell. The first cell may autonomously change the uplink:downlink configuration of the SCC, e.g., without informing the at least one neighbor cell.

In one design, the first cell may schedule the UE on the PCC or the SCC based on whether the UE potentially observes strong inter-cell interference on the SCC. The first cell may determine whether the UE potentially observes strong inter-cell interference based on a measurement report from the UE.

In one design, the first cell may receive first CSI report for the SCC for a first subframe type from the UE and may also receive a second CSI report for the SCC for a second subframe type from the UE. Subframes of the first subframe type (e.g., non-I subframes) may not be subject to interference from UEs in the at least one neighbor cell. Subframes of the second subframe type (e.g., I subframes) may be subject to interference from the UEs in the at least one neighbor cell. The first cell may schedule the UE on the SCC (i) in a subframe of the first subframe type based on the first CSI report or (ii) in a subframe of the second subframe type based on the second CSI report. In another design, the first cell may receive a CSI report for the SCC for the first subframe type from the UE. The first cell may schedule the UE on the SCC in a subframe of the first subframe type based on the CSI report.

In one design, the base station may determine an effective UL:DL partitioning for each of a plurality of subframes based on an uplink:downlink configuration for each of the plurality of CCs. The base station may select a subframe in which to schedule the UE for data transmission based on the effective UL:DL partitioning for each of the plurality of subframes. The base station may select the subframe in which to schedule the UE for data transmission based further on the capability of the UE, the amount of data to send to or by the UE, data requirements of the UE, and/or other factors.

The control information may comprise at least one downlink grant. For block 1216, the base station may send data on at least one CC to the UE based on the at least one downlink grant. The control information may comprise at least one uplink grant. For block 1216, the base station may receive data sent on at least one CC by the UE based on the at least one uplink grant. Data may be sent on each of the plurality of CCs based on an HARQ timeline that is applicable for all of the CCs.

In one design, uplink ACK/NACK may be sent on the PCC for downlink data sent on at least one CC. The base station may receive ACK/NACK sent on the PCC by the UE, and the ACK/NACK may be for data sent on the at least one CC to the UE. In another design, uplink ACK/NACK may be sent on the SCC for downlink data sent on the SCC. The base station may receive ACK/NACK sent on the SCC by the UE, and the ACK/NACK may be for data sent on the SCC to the UE. In yet another design, downlink ACK/NACK may be sent on the PCC for uplink data sent on at least one CC. The base station may send ACK/NACK on the PCC to the UE, and the ACK/NACK may be for data received on at least one CC from the UE. In yet another design, downlink ACK/NACK may be sent on the PCC for uplink data sent on the SCC. The base station may send ACK/NACK on the PCC to the UE, and the ACK/NACK may be for data received on the SCC from the UE.

FIG. 13 shows a process 1300 for communicating with carrier aggregation. The process 1300 may be performed by a UE (as described below) or by some other entity. The UE may be served by a base station and may determine a plurality of CCs configured for the UE (block 1312). The plurality of CCs may include a PCC and an SCC. The PCC may be associated with the same uplink:downlink configuration at the first cell and at least one neighbor cell. The SCC may be associated with different uplink:downlink configurations at the first cell and the at least one neighbor cell. The UE may receive control information sent on the PCC to the UE (block 1314). The UE may exchange data on at least one of the plurality of CCs with the first cell (block 1316).

In one design, the UE may send a first CSI report for the SCC for a first subframe type and may send a second CSI report for the SCC for a second subframe type. Subframes of the first subframe type (e.g., non-I subframes) may not be subject to interference from UEs in the at least one neighbor cell. Subframes of the second subframe type (e.g., I subframes) may be subject to interference from the UEs in the at least one neighbor cell. The UE may be scheduled on the SCC (i) in a subframe of the first subframe type based on the first CSI report or (ii) in a subframe of the second subframe type based on the second CSI report. In another design, the UE may send a CSI report for the SCC for the first subframe type. The UE may be scheduled on the SCC in a subframe of the first subframe type based on the CSI report.

The UE may send data to the base station in block 1316. The UE may then receive ACK/NACK from the base station for the data sent to the base station. Alternatively or additionally, the UE may receive data from the base station in block 1316. The UE may then send ACK/NACK to the base station for the data received from the base station. Data and ACK/NACK may be sent or received in a complementary manner described for the base station in FIG. 13.

Figure 14:
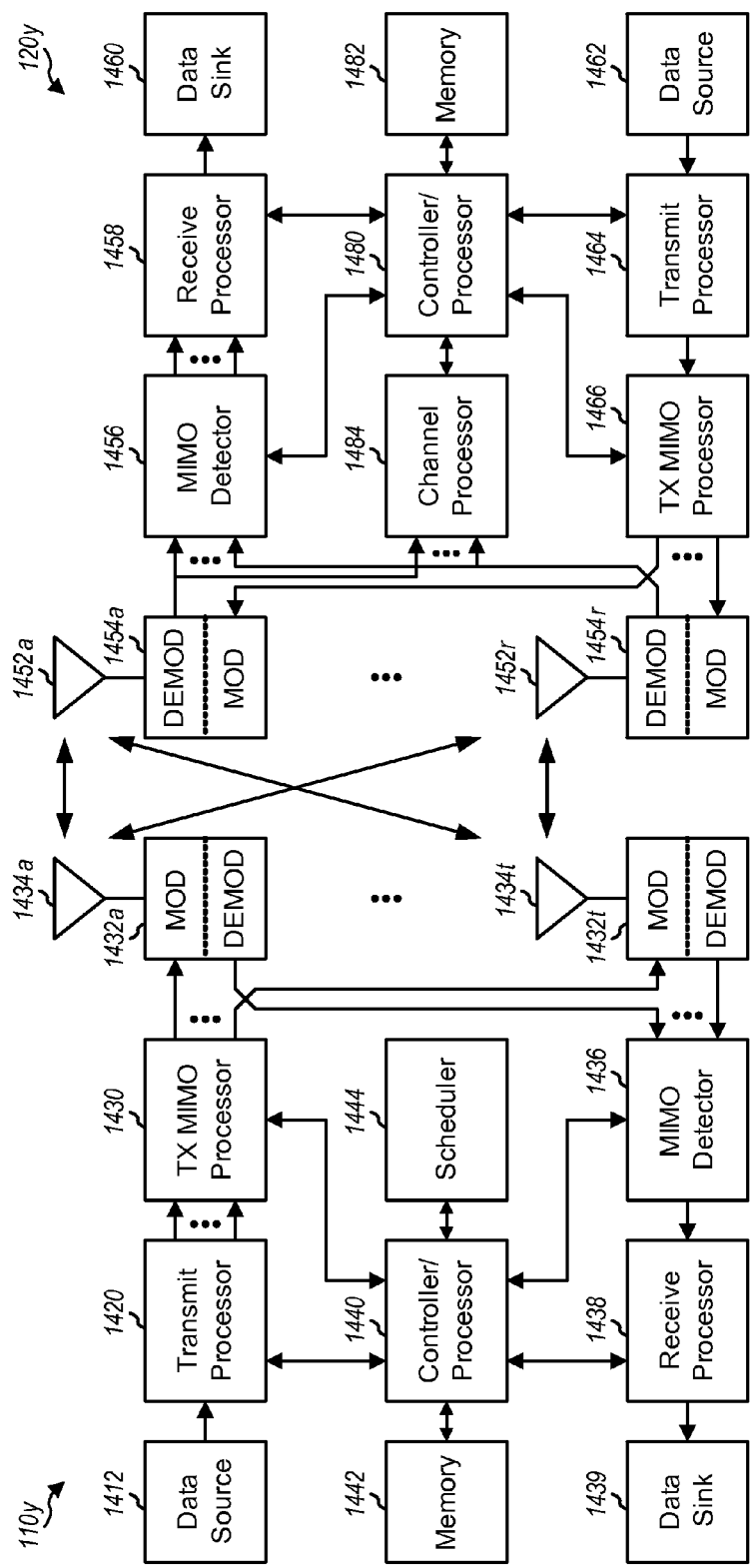
FIG. 14 is a block diagram of a design of a base station/eNB and a UE, which may be one of the base stations/eNBs and one of the UEs in FIG. 1.

FIG. 14 shows a block diagram of a design of a base station/eNB 110y and a UE 120y, which may be one of the base stations/eNBs and one of the UEs in FIG. 1. Base station 110y may be equipped with T antennas 1434a through 1434t, and UE 120y may be equipped with R antennas 1452a through 1452r, where in general T greater than or equal to 1 and is greater than or equal to 1.

At base station 110y, a transmit processor 1420 may receive data from a data source 1412 for one or more UEs, process (e.g., encode and modulate) the data for each UE based on one or more modulation and coding schemes selected for that UE, and provide data symbols for all UEs. Transmit processor 1420 may also process control information (e.g., for downlink grants, uplink grants, ACK/NACK, etc.) and provide control symbols. Processor 1420 may also generate reference symbols for reference signals. A transmit (TX) multiple-input multiple-output (MIMO) processor 1430 may precode the data symbols, the control symbols, and/or the reference symbols (if applicable) and may provide T output symbol streams to T modulators (MOD) 1432a through 1432t. Each modulator 1432 may process its output symbol stream (e.g., for OFDM, etc.) to obtain an output sample stream. Each modulator 1432 may further condition (e.g., convert to analog, amplify, filter, and upconvert) its output sample stream to obtain a downlink signal. T downlink signals from modulators 1432a through 1432t may be transmitted via T antennas 1434a through 1434t, respectively.

At UE 120y, antennas 1452a through 1452r may receive the downlink signals from base station 110y and/or other base stations and may provide received signals to demodulators (DEMODs) 1454a through 1454r, respectively. Each demodulator 1454 may condition (e.g., filter, amplify, downconvert, and digitize) its received signal to obtain input samples. Each demodulator 1454 may further process the input samples (e.g., for OFDM, etc.) to obtain received symbols. A MIMO detector 1456 may obtain received symbols from all R demodulators 1454a through 1454r, perform MIMO detection on the received symbols, and provide detected symbols. A receive processor 1458 may process (e.g., demodulate and decode) the detected symbols, provide decoded data for UE 120y to a data sink 1460, and provide decoded control information to a controller/processor 1480. A channel processor 1484 may measure the channel response and interference for different carriers based on reference signals received on these carriers and may determine CSI for each carrier of interest.

On the uplink, at UE 120y, a transmit processor 1464 may receive and process data from a data source 1462 and control information (e.g., ACK/NACK, CSI, etc.) from controller/processor 1480. Processor 1464 may also generate reference symbols for one or more reference signals. The symbols from transmit processor 1464 may be precoded by a TX MIMO processor 1466 if applicable, further processed by modulators 1454a through 1454r (e.g., for SC-FDM, OFDM, etc.), and transmitted to base station 110y. At base station 110y, the uplink signals from UE 120y and other UEs may be received by antennas 1434, processed by demodulators 1432, detected by a MIMO detector 1436 if applicable, and further processed by a receive processor 1438 to obtain decoded data and control information sent by UE 120y and other UEs. Processor 1438 may provide the decoded data to a data sink 1439 and the decoded control information to controller/processor 1440.

Controllers/processors 1440 and 1480 may direct the operation at base station 110y and UE 120y, respectively. Processor 1440 and/or other processors and modules at base station 110y may perform or direct process 1000 in FIG. 10, process 1200 in FIG. 12, and/or other processes for the techniques described herein. Processor 1480 and/or other processors and modules at UE 120y may perform or direct process 1100 in FIG. 11, process 1300 in FIG. 13, and/or other processes for the techniques described herein. Memories 1442 and 1482 may store data and program codes for base station 110y and UE 120y, respectively. A scheduler 1444 may schedule UEs for data transmission on the downlink and/or uplink.

Figure 15:
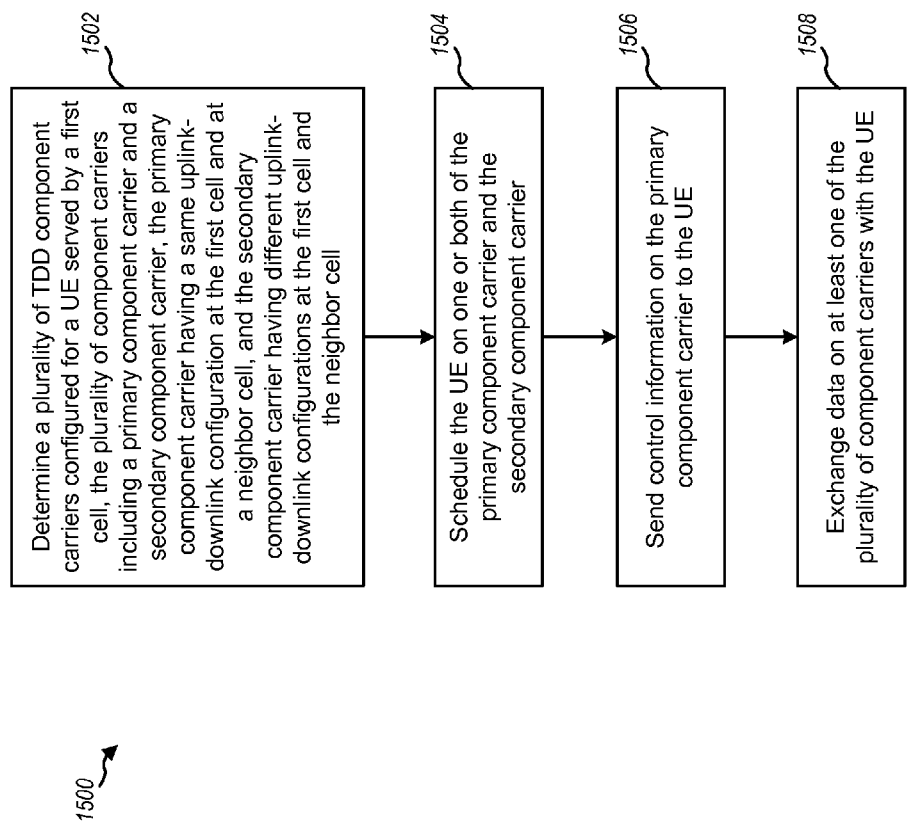
FIG. 15 is a flow chart of a method of wireless communication supporting hybrid carrier aggregation.

FIG. 15 is a flow chart 1500 of a method of wireless communication supporting hybrid carrier aggregation. The method may be performed by an eNB. The hybrid carrier aggregation may be an aggregation of component carriers with different uplink:downlink configurations for TTD. The aggregation may further involve FDD component carriers.

At step 1502, the eNB determines a plurality of TDD component carriers configured for a UE that is served by the eNB. The eNB previously set the component carrier configurations for the UE. Accordingly, the eNB determines the TDD component carriers configured for the UE based on the component carrier configuration that the eNB set for the UE. The plurality of component carriers may include a primary component carrier and a secondary component carrier. The primary component carrier has a same uplink:downlink configuration at a first cell and at a neighbor cell, while the secondary component carrier has different uplink:downlink configurations at the first cell and the neighbor cell. Examples of such TDD component carrier arrangements are described above with reference to FIG. 9.

The primary component carrier may have a configurable uplink:downlink configuration. Changes to the uplink:downlink configuration of the primary component carrier may be synchronized at the first cell and the neighbor cell so that the primary component carrier at the first cell and the primary component carrier at the neighbor cell maintain the same uplink:downlink configuration. See, for example, FIG. 9, where the uplink-downlink partitioning of TDD CC1 (PCC) for cell A is the same as the uplink-downlink partitioning of TDD CC1 (PCC) for cell B. The secondary component carrier may also have a configurable uplink:downlink configuration at the first cell.

At step 1504, the eNB schedules the UE on one or both of the primary component carrier and the secondary component carrier. In one configuration, the schedule is based on inter-cell interference. In this case, the eNB determines a measure of inter-cell interference observed by the UE, and schedules the UE on one of the primary component carrier and the secondary component carrier based on the determined measure. The eNB may schedule the UE on the primary component carrier when the determined measure corresponds to strong inter-cell interference. The eNB may schedule the UE on the secondary component carrier when the determined measure does not correspond to strong inter-cell interference.

As described above, the measure of inter-cell interference observed by the UE may be determined in various manners. In one design, strong inter-cell interference may be determined based on a measurement report sent by a UE. The report may include received signal strengths of cells detected by the UE, e.g., cells with received signal strength exceeding a threshold. The UE may be deemed to observe strong interference from a neighbor cell if the received signal strength for the neighbor cell exceeds a high threshold. In another design, strong inter-cell interference may be determined based on interference measurements made by a cell of UEs not served by the cell. Strong inter-cell interference may also be determined in other manners.

In other configurations, the eNB may schedule UEs based on one or more CSI reports received from the UE. In one such implementation, the eNB receives a CSI report from a UE for a subframe of a secondary component carrier, where the subframe corresponds to a first type of subframe. The first subframe type may be a subframe that is not subject to interference from UEs in the neighbor cell. As described above, these types of subframes may be referred to as non-interference (non-I) subframes or clean subframes. In this case, the eNB may schedule the UE on the secondary component carrier in a subframe of the first subframe type based on the CSI report.

In another implementation, the eNB receives a first CSI report and a second CSI report from the UE. The first CSI report is for a subframe of a secondary component carrier corresponding to a first type of subframe. The first subframe type may be a subframe that is not subject to interference from UEs in the neighbor cell. The second CSI report is for a subframe of the secondary component carrier corresponding to a second type of subframe. The second subframe type may be a subframe that is subject to interference from the UEs in the neighbor cell. As described above, these types of subframes may be referred to as interference (I) subframes or unclean subframes. In this case, the eNB may schedule the UE on the secondary component carrier in a subframe of the first subframe type based on the first CSI report, or in a subframe of the second subframe type based on the second CSI report.

In another configuration, the eNB determines an effective uplink:downlink partitioning for each of a plurality of subframes based on an uplink:downlink configuration for each of the plurality of component carriers. The eNB then selects a subframe in which to schedule the UE for data transmission based on the effective uplink:downlink partitioning for each of the plurality of subframes. For example The subframe in which to schedule the UE for data transmission may further be selected based UE capability, amount of data to send to the UE, and/or data requirements of the UE.

At step 1506, the eNB sends control information on the primary component carrier to the UE. At step 1508, the eNB exchanges data on at least one of the plurality of component carriers with the UE. As described above with reference to FIG. 6C, control information may include at least one downlink grant, in which case the eNB exchanges data by sending data on at least one component carrier to the UE based on the at least one downlink grant. As described above with reference to FIG. 6B, control information may also include at least one uplink grant, in which case the eNB exchanges data by receiving data sent on at least one component carrier by the UE based on the at least one uplink grant.

In one embodiment, the plurality of component carriers may also include a FDD component carrier. In this case, the eNB may send control information on the FDD component carrier to the UE. The control information sent on the FDD component carrier may include a downlink grant for downlink data on a downlink subframe of the TDD component carrier, or an uplink grant for uplink data on an uplink subframe of a TDD component carrier.

In the case of downlink grants sent on the FDD component carrier, the eNB may receive an uplink signal, e.g., ACK/NACK, from the UE in an appropriately sequenced subframe. For example, as described above with reference to FIGS. 6A through 6C, the appropriately sequenced subframe may be a certain number of subframes (e.g., t+4) after the downlink subframe (e.g., t) in which the downlink grant was sent. The uplink signal received by the eNB is sent on the TDD component carrier if the TDD component carrier subframe coincident with the appropriately sequenced subframe is an uplink subframe. See, for example, FIG. 6C where the uplink ACK/NACK corresponding to the downlink data sent in subframe zero of TDD CC 3 is sent on the fourth subframe of TDD CC 3 because the fourth subframe of TDD CC 3 is an uplink subframe. The uplink signal is sent on the FDD component carrier if the TDD component carrier subframe coincident with the appropriately sequenced subframe is a downlink subframe. See, for example, FIG. 6C where the uplink ACK/NACK corresponding to the downlink data sent in subframe zero of TDD CC 2 is sent on the fourth subframe of FDD CC 1 uplink because the fourth subframe of TDD CC 2 is an downlink subframe.

In the case of uplink grants sent on the FDD component carrier, the eNB transmits an uplink grant in an appropriately sequenced subframe of the FDD component carrier relative to an uplink subframe of the TDD component carrier. The appropriately sequenced subframe may be a certain number of subframes (e.g., t−4) prior to the uplink subframe (e.g., t) in which an uplink data transmission may occur. See, for example, FIG. 6B where TDD CC 2 and TDD CC 3 have uplink subframes in subframe t=3, and an uplink grant is sent on FDD CC 1 in subframe 9, which is four subframes prior to subframe 3.

Figure 16:
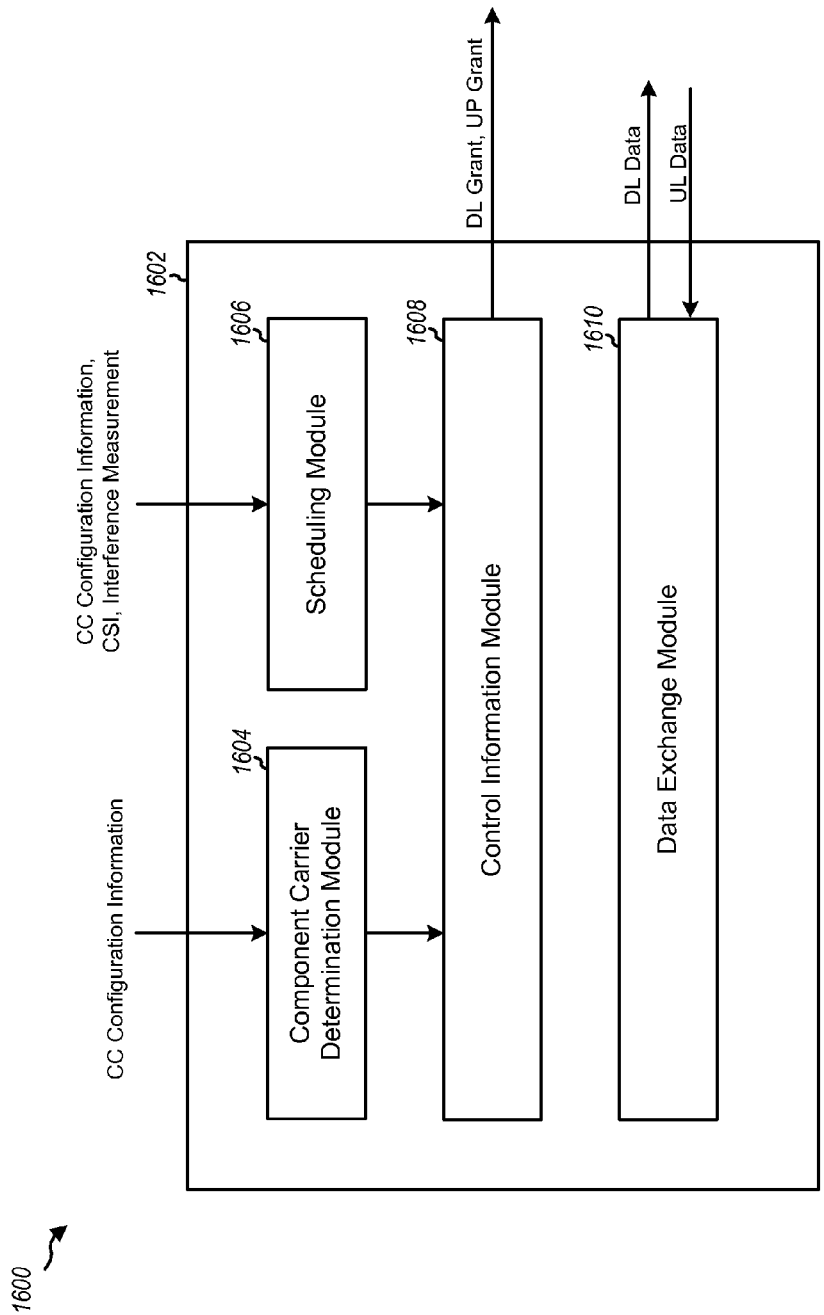
FIG. 16 is a conceptual data flow diagram illustrating the data flow between different modules/means/components in an exemplary apparatus.

FIG. 16 is a data flow diagram 1600 illustrating the data flow between different modules/means/components in an apparatus 1602. The apparatus may be an eNB. The apparatus includes a component carrier determination module 1604, a scheduling module 1606, a control information module 1608, and a data exchange module 1610.

The component carrier determination module 1604 determines a plurality of TDD component carriers configured for a UE served by the eNB. The plurality of component carriers includes a primary component carrier and a secondary component carrier. The primary component carrier has a same uplink:downlink configuration at the first cell and at a neighbor cell, and the secondary component carrier has different uplink:downlink configurations at the first cell and the neighbor cell.

The scheduling module 1606 schedules the UE on one of the primary component carrier and the secondary component carrier. For example, the scheduling module 1606 may determine a measure of inter-cell interference observed by the UE, and schedule the UE on one of the primary component carrier and the secondary component carrier based on the determined measure. The scheduling module 1606 may schedule the UE on the primary component carrier when the determined measure corresponds to strong inter-cell interference and on the secondary component carrier when the determined measure does not correspond to strong inter-cell interference.

The scheduling module 1606 may receive a first CSI report from the UE for a first subframe type of the secondary component carrier, where subframes of the first subframe type are not subject to interference from UEs in the neighbor cell. The scheduling module 1606 may schedule the UE on the secondary component carrier in a subframe of the first subframe type based on the CSI report. The scheduling module 1606 may also receive a second CSI report from the UE, for a second subframe type of the secondary component carrier, where subframes of the second subframe type are subject to interference from the UEs in the neighbor cell. The scheduling module 1606 may schedule the UE on the secondary component carrier in a subframe of the first subframe type based on the first CSI report or in a subframe of the second subframe type based on the second CSI report.

The scheduling module 1606 may also determine an effective uplink:downlink partitioning for each of a plurality of subframes based on an uplink:downlink configuration for each of the plurality of component carriers, and select a subframe in which to schedule the UE for data transmission based on the effective uplink:downlink partitioning for each of the plurality of subframes.

The control information module 1608 sends control information on the primary component carrier to the UE. The data exchange module 1610 exchanges, e.g., sends and/or receives, data on at least one of the plurality of component carriers with the UE. The control information sent by the control information module may include at least one downlink grant. In this case, the data exchange module 1610 sends data on at least one component carrier to the UE based on the at least one downlink grant. The control information sent by the control information module 1608 may include at least one uplink grant. In this case, the data exchange module 1610 receives data sent on at least one component carrier by the UE based on the at least one uplink grant. The control information sent by the control information module 1608 may be sent on an FDD component carrier and may include a downlink grant for downlink data on a downlink subframe of the TDD component carrier. In this case, the data exchange module 1610 may receive an uplink signal from the UE in an appropriately sequenced subframe of the TDD component carrier when the TDD component carrier subframe coincident with the appropriately sequenced subframe is an uplink subframe. The data exchange module 1610 may receive an uplink signal from the UE sent on the FDD component carrier when the TDD component carrier subframe coincident with the appropriately sequenced subframe is a downlink subframe.

The apparatus may include additional modules that perform each of the steps of the algorithm in the aforementioned flow chart of FIG. 15. As such, each step in the aforementioned flow chart of FIG. 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
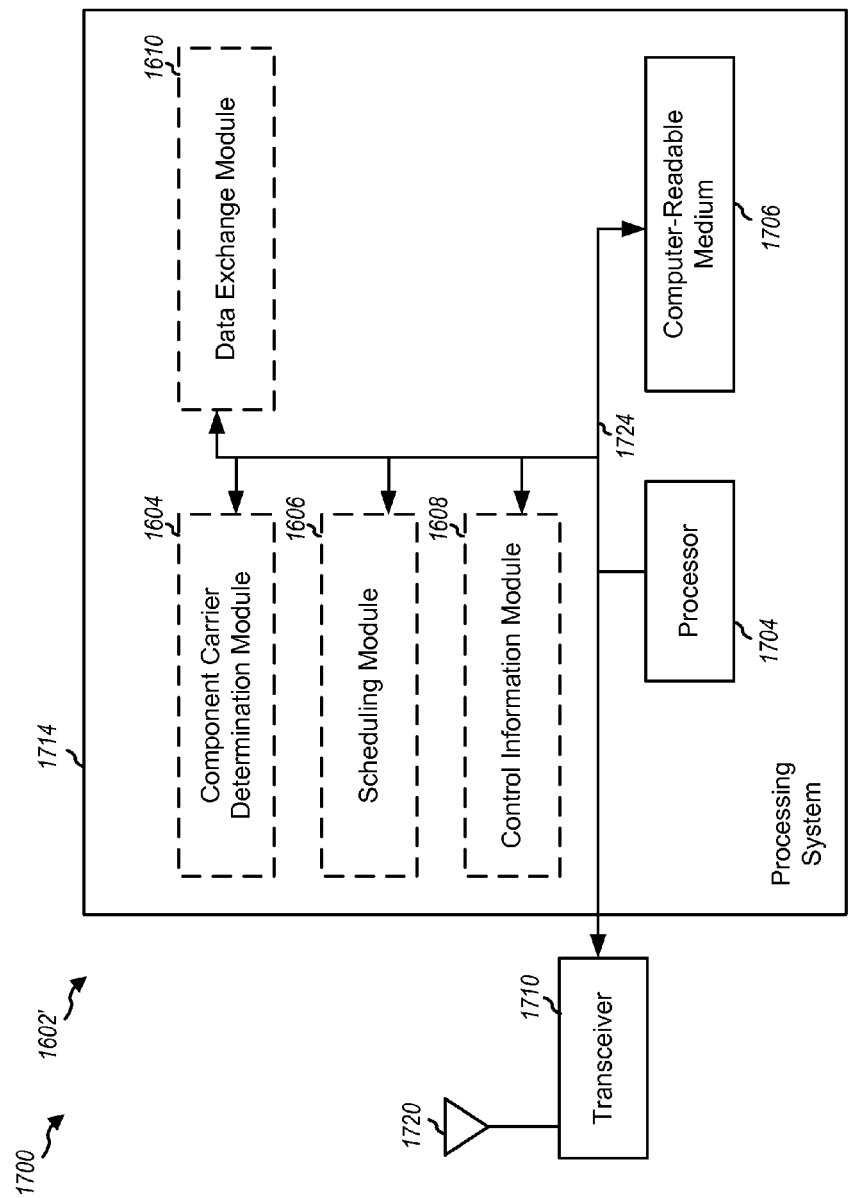
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1604, 1606, 1608, 1610 and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714. In addition, the transceiver 1710 receives information from the processing system 1714, and based on the received information, generates a signal to be applied to the one or more antennas 1720. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes at least one of the modules 1604, 1606, 1608 and 1610. The modules may be software modules running in the processor 1704, resident/stored in the computer readable medium 1706, one or more hardware modules coupled to the processor 1704, or some combination thereof. The processing system 1714 may be a component of the eNB 110y and may include the memory 1442 and/or at least one of the TX processor 1420, the RX processor 1438, and the controller/processor 1440.

In one configuration, the apparatus 1602/1602' for wireless communication includes means for determining a plurality of TDD component carriers configured for a UE served by an eNB. The plurality of component carriers may include a primary component carrier and a secondary component carrier. The primary component carrier has a same uplink:downlink configuration at the first cell and at a neighbor cell, and the secondary component carrier has a different uplink:downlink configurations at the first cell and the neighbor cell. The apparatus 1602/1602' also includes means for sending control information on the primary component carrier to the UE, and means for exchanging data on at least one of the plurality of component carriers with the UE.

The apparatus 1602/1602' may further include means for determining a measure of inter-cell interference observed by the UE, means for scheduling the UE on one of the primary component carrier and the secondary component carrier based on the determined measure, means for receiving a CSI report from the UE, the report for the secondary component carrier for a first subframe type, wherein subframes of the first subframe type are not subject to interference from UEs in the neighbor cell, and means for scheduling the UE on the secondary component carrier in a subframe of the first subframe type based on the CSI report. The apparatus 1602/1602' may further include means for receiving a second CSI report from the UE, the second report for the secondary component carrier for a second subframe type from the UE, wherein subframes of the second subframe type are subject to interference from the UEs in the neighbor cell, and means for scheduling the UE on the secondary component carrier in a subframe of the first subframe type based on the first CSI report or in a subframe of the second subframe type based on the second CSI report.

The apparatus 1602/1602' may further include means for determining an effective uplink:downlink partitioning for each of a plurality of subframes based on an uplink:downlink configuration for each of the plurality of component carriers, and means for selecting a subframe in which to schedule the UE for data transmission based on the effective uplink:downlink partitioning for each of the plurality of sub frames.

The apparatus 1602/1602' may further include means for sending control information on an FDD component carrier to the UE and means for receiving an uplink signal from the UE in an appropriately sequenced subframe, where the uplink signal is sent on the TDD component carrier if the TDD component carrier subframe coincident with the appropriately sequenced subframe is an uplink subframe.

The aforementioned means may be one or more of the aforementioned modules of the apparatus 1602 and/or the processing system 1714 of the apparatus 1602' configured to perform the functions recited by the aforementioned means. As described supra, the processing system 1714 may include the TX processor 1420, the RX processor 1438, and the controller/processor 1440. As such, in one configuration, the aforementioned means may be the TX processor 1420, the RX processor 1438, and the controller/processor 1440 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs or methods, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication of a base station, comprising:
   determining a plurality of time division duplex (TDD) component carriers of a plurality of component carriers configured for a user equipment (UE) served by the base station, the plurality of TDD component carriers including a primary component carrier and a secondary component carrier, the primary component carrier having a same uplink:downlink configuration as a first cell at a neighboring base station, and the secondary component carrier having a different uplink:downlink configuration as a second cell at the neighboring base station;
   sending control information on the primary component carrier to the UE; and
   exchanging data on at least one of the plurality of component carriers with the UE.

2. The method of claim 1, further comprising:
   determining an effective uplink:downlink partitioning for a plurality of subframes in the plurality of TDD component carriers configured for the UE based on an uplink:downlink configuration for each TDD component carrier;
   determining a subframe in which to schedule the UE for data transmission based on the effective uplink:downlink partitioning; and
   sending a resource grant in the determined subframe.

3. The method of claim 2, wherein the resource grant comprises a grant for downlink data, and further comprising determining an uplink subframe for an ACK/NACK feedback by the UE, the ACK/NACK feedback associated with the data transmission.

4. The method of claim 3, wherein the plurality of component carriers comprises a frequency division duplex (FDD) component carrier, the method further comprising:
   receiving the ACK/NACK feedback on a TDD component carrier when an uplink subframe is available on the TDD component carrier; and
   receiving the ACK/NACK feedback on the FDD component carrier when an uplink subframe is not available on the TDD component carrier.

5. The method of claim 2, wherein the plurality of component carriers comprises a frequency division duplex (FDD) component carrier, the method further comprising:
   sending the resource grant on the FDD component carrier, wherein the resource grant comprises a grant for downlink data on the TDD component carrier; and
   receiving, in a subframe determined in accordance with the effective uplink:downlink partitioning, an uplink signal from the UE responsive to the grant for downlink data.

6. The method of claim 5, wherein the uplink signal from the UE comprises an ACK/NACK feedback associated with a transmission of downlink data, the ACK/NACK feedback received based on an availability of uplink subframes in the effective uplink:downlink partitioning.

7. The method of claim 2, wherein the plurality of component carriers comprises a frequency division duplex (FDD) component carrier, the method comprising:
   sending the resource grant on the FDD component carrier, wherein the resource grant comprises a grant for uplink data on the TDD component carrier;
   receiving uplink data; and
   sending, in a subframe determined in accordance with the effective uplink-downlink partitioning, a downlink signal from the base station responsive to the uplink data.

8. The method of claim 7, wherein the downlink signal from the base station comprises an ACK/NACK feedback associated with a transmission of uplink data.

9. The method of claim 2, further comprising updating the effective uplink:downlink partitioning in accordance with a change in the uplink:downlink configuration of at least one TDD component carrier at the neighboring base station.

10. The method of claim 2, wherein determining a subframe comprises selecting the subframe in which to schedule the UE for data transmission based further on at least one of capability of the UE, an amount of data to send to the UE, and data requirements of the UE.

11. The method of claim 1, wherein the primary component carrier has a configurable uplink:downlink configuration, and further comprising synchronizing the uplink:downlink configuration of the primary component carrier at the first cell with the uplink:downlink configuration of the primary component carrier of the neighboring base station.

12. The method of claim 1, further comprising:
   determining a target effective uplink:downlink partitioning for exchanging data with one or more UEs served by the first cell; and
   adjusting an uplink:downlink configuration of the secondary component carrier based at least in part on a result of the determining.

13. The method of claim 1, further comprising:
   determining a measure of inter-cell interference observed by the UE and resulting from the secondary component carrier having different uplink:downlink configurations at the base station and the neighboring base station; and
   scheduling the UE on one of the primary component carrier and the secondary component carrier based on the determined measure.

14. The method of claim 13, wherein the UE is scheduled on the primary component carrier when the determined measure corresponds to strong inter-cell interference.

15. The method of claim 13, wherein the UE is scheduled on the secondary component carrier when the determined measure does not correspond to strong inter-cell interference.

16. The method of claim 13, further comprising:
   receiving a first channel state information (CSI) report from the UE, the first CSI report for the secondary component carrier for a first subframe type, wherein subframes of the first subframe type are not subject to interference from UEs served by the neighboring base station; and
   scheduling the UE on the secondary component carrier in a subframe of the first subframe type based on the first CSI report.

17. The method of claim 14, further comprising:
   receiving a second CSI report from the UE, the second CSI report for the secondary component carrier for a second subframe type from the UE, wherein subframes of the second subframe type are subject to interference from the UEs served by the neighboring base station; and
   scheduling the UE on the secondary component carrier in a subframe of the first subframe type based on the first CSI report or in a subframe of the second subframe type based on the second CSI report.

18. An apparatus for a base station in a wireless communication system, comprising:
   means for determining a plurality of time division duplex (TDD) component carriers of a plurality component carriers configured for a user equipment (UE) served by the apparatus, the plurality of TDD component carriers including a primary component carrier and a secondary component carrier, the primary component carrier having a same uplink:downlink configuration as a first cell at a neighboring base station, and the secondary component carrier having a different uplink:downlink configuration as a second cell at the neighboring base station;
   means for sending control information on the primary component carrier to the UE; and
   means for exchanging data on at least one of the plurality of component carriers with the UE.

19. The apparatus of claim 18, further comprising:
   means for determining an effective uplink:downlink partitioning for a plurality of subframes in the plurality of TDD component carriers configured for the UE based on an uplink:downlink configuration for each TDD component carrier;
   means for determining a subframe in which to schedule the UE for data transmission based on the effective uplink: downlink partitioning; and
   means for sending a resource grant in the determined subframe.

20. The apparatus of claim 19, wherein the resource grant comprises a grant for downlink data, and further comprising means for determining an uplink subframe for an ACK/NACK feedback by the UE, the ACK/NACK feedback associated with the data transmission.

21. The apparatus of claim 20, wherein the plurality of component carriers comprises a frequency division duplex (FDD) component carrier, the apparatus further comprising:
   means for receiving the ACK/NACK feedback on a TDD component carrier when an uplink subframe is available on the TDD component carrier; and
   means for receiving the ACK/NACK feedback on the FDD component carrier when an uplink subframe is not available on the TDD component carrier.

22. The apparatus of claim 19, wherein the plurality of component carriers comprises a frequency division duplex (FDD) component carrier, the apparatus further comprising:
means for sending the resource grant on the FDD component carrier, wherein the resource grant comprises a grant for downlink data on the TDD component carrier; and
means for receiving, in a subframe determined in accordance with the effective uplink:downlink partitioning, an uplink signal from the UE responsive to the grant for downlink data.

23. The apparatus of claim 22, wherein the uplink signal from the UE comprises an ACK/NACK feedback associated with a transmission of downlink data, the ACK/NACK feedback received based on an availability of uplink subframes in the effective uplink:downlink partitioning.

24. The apparatus of claim 19, wherein the plurality of component carriers comprises a frequency division duplex (FDD) component carrier, the apparatus comprising:
means for sending the resource grant on the FDD component carrier, wherein the resource grant comprises a grant for uplink data on the TDD component carrier;
means for receiving uplink data; and
means for sending, in a subframe determined in accordance with the effective uplink:downlink partitioning, a downlink signal from the base station responsive to the uplink data.

25. The apparatus of claim 24, wherein the downlink signal from the base station comprises an ACK/NACK feedback associated with a transmission of uplink data.

26. The apparatus of claim 19, further comprising means for updating the effective uplink:downlink partitioning in accordance with a change in the uplink:downlink configuration of at least one TDD component carrier at the neighboring base station.

27. The apparatus of claim 19, wherein the means for determining a subframe is configured to select the subframe in which to schedule the UE for data transmission based further on at least one of capability of the UE, an amount of data to send to the UE, and data requirements of the UE.

28. The apparatus of claim 18, wherein the primary component carrier has a configurable uplink:downlink configuration, and further comprising means for synchronizing the uplink:downlink configuration of the primary component carrier at the first cell with the uplink:downlink configuration of the primary component carrier of the neighboring base station.

29. The apparatus of claim 18, further comprising:
means for determining a target effective uplink:downlink partitioning for exchanging data with one or more UEs served by the first cell; and
means for adjusting an uplink:downlink configuration of the secondary component carrier based at least in part on a result of the determining.

30. The apparatus of claim 18, further comprising:
means for determining a measure of inter-cell interference observed by the UE and resulting from the secondary component carrier having different uplink:downlink configurations at the base station and the neighboring base station; and
means for scheduling the UE on one of the primary component carrier and the secondary component carrier based on the determined measure.

31. The apparatus of claim 30, wherein the UE is scheduled on the primary component carrier when the determined measure corresponds to strong inter-cell interference.

32. The apparatus of claim 30, wherein the UE is scheduled on the secondary component carrier when the determined measure does not correspond to strong inter-cell interference.

33. The apparatus of claim 30, further comprising:
means for receiving a first channel state information (CSI) report from the UE, the first CSI report for the secondary component carrier for a first subframe type, wherein subframes of the first subframe type are not subject to interference from UEs served by the neighboring base station; and
means for scheduling the UE on the secondary component carrier in a subframe of the first subframe type based on the first CSI report.

34. The apparatus of claim 31, further comprising:
means for receiving a second CSI report from the UE, the second CSI report for the secondary component carrier for a second subframe type from the UE, wherein subframes of the second subframe type are subject to interference from the UEs served by the neighboring base station; and
means for scheduling the UE on the secondary component carrier in a subframe of the first subframe type based on the first CSI report or in a subframe of the second subframe type based on the second CSI report.

35. An apparatus for a base station in a wireless communication system, comprising:
a memory; and
a processing system coupled to the memory and configured to:
determine a plurality of time division duplex (TDD) component carriers of a plurality of component carriers configured for a user equipment (UE) served by the apparatus, the plurality of TDD component carriers including a primary component carrier and a secondary component carrier, the primary component carrier having a same uplink:downlink configuration as a first cell at a neighboring base station, and the secondary component carrier having a different uplink:downlink configuration as a second cell at the neighboring base station;
send control information on the primary component carrier to the UE; and
exchange data on at least one of the plurality of component carriers with the UE.

36. The apparatus of claim 35, the processing system further configured to:
determine an effective uplink:downlink partitioning for a plurality of subframes in the plurality of TDD component carriers configured for the UE based on an uplink:downlink configuration for each TDD component carrier;
determine a subframe in which to schedule the UE for data transmission based on the effective uplink:downlink partitioning; and
send a resource grant in the determined subframe.

37. The apparatus of claim 36, wherein the resource grant comprises a grant for downlink data, and the processing system is further configured to determine an uplink subframe for an ACK/NACK feedback by the UE, the ACK/NACK feedback associated with the data transmission.

38. The apparatus of claim 37, wherein the plurality of component carriers comprises a frequency division duplex (FDD) component carrier, the processing system further configured to:
receive the ACK/NACK feedback on a TDD component carrier when an uplink subframe is available on the TDD component carrier; and receive the ACK/NACK feedback on the FDD component carrier when an uplink subframe is not available on the TDD component carrier.

39. The apparatus of claim 36, wherein the plurality of component carriers comprises a frequency division duplex (FDD) component carrier, the processing system further configured to:
send the resource grant on the FDD component carrier, wherein the resource grant comprises a grant for downlink data on the TDD component carrier; and
receive, in a subframe determined in accordance with the effective uplink:downlink partitioning, an uplink signal from the UE responsive to the grant for downlink data.

40. The apparatus of claim 39, wherein the uplink signal from the UE comprises an ACK/NACK feedback associated with a transmission of downlink data, the ACK/NACK feedback received based on an availability of uplink subframes in the effective uplink:downlink partitioning.

41. The apparatus of claim 36, wherein the plurality of component carriers comprises a frequency division duplex (FDD) component carrier, the processing system configured to:
send the resource grant on the FDD component carrier, wherein the resource grant comprises a grant for uplink data on the TDD component carrier;
receive uplink data; and
send, in a subframe determined in accordance with the effective uplink:downlink partitioning, a downlink signal from the base station responsive to the uplink data.

42. The apparatus of claim 41, wherein the downlink signal from the base station comprises an ACK/NACK feedback associated with a transmission of uplink data.

43. The apparatus of claim 36, the processing system further configured to update the effective uplink:downlink partitioning in accordance with a change in the uplink:downlink configuration of at least one TDD component carrier at the neighboring base station.

44. The apparatus of claim 36, wherein the processing system is further configured to select the subframe in which to schedule the UE for data transmission based further on at least one of capability of the UE, an amount of data to send to the UE, and data requirements of the UE.

45. The apparatus of claim 35, wherein the primary component carrier has a configurable uplink:downlink configuration, the processing system further configured to synchronize the uplink:downlink configuration of the primary component carrier at the first cell with the uplink:downlink configuration of the primary component carrier of the neighboring base station.

46. The apparatus of claim 35, the processing system further configured to:
determine a target effective uplink:downlink partitioning for exchanging data with one or more UEs served by the first cell; and
adjust an uplink:downlink configuration of the secondary component carrier based at least in part on a result of the determining.

47. The apparatus of claim 35, the processing system further configured to:
determine a measure of inter-cell interference observed by the UE and resulting from the secondary component carrier having different uplink:downlink configurations at the base station and the neighboring base station; and
schedule the UE on one of the primary component carrier and the secondary component carrier based on the determined measure.

48. The apparatus of claim 47, wherein the UE is scheduled on the primary component carrier when the determined measure corresponds to strong inter-cell interference.

49. The apparatus of claim 47, wherein the UE is scheduled on the secondary component carrier when the determined measure does not correspond to strong inter-cell interference.

50. The apparatus of claim 47, the processing system further configured to:
receive a first channel state information (CSI) report from the UE, the first CSI report for the secondary component carrier for a first subframe type, wherein subframes of the first subframe type are not subject to interference from UEs served by the neighboring base station; and
schedule the UE on the secondary component carrier in a subframe of the first subframe type based on the first CSI report.

51. The apparatus of claim 50, the processing system further configured to:
receive a second CSI report from the UE, the second CSI report for the secondary component carrier for a second subframe type from the UE, wherein subframes of the second subframe type are subject to interference from the UEs served by the neighboring base station; and
schedule the UE on the secondary component carrier in a subframe of the first subframe type based on the first CSI report or in a subframe of the second subframe type based on the second CSI report.

52. A non-transitory computer-readable medium comprising code for:
determining a plurality of time division duplex (TDD) component carriers of a plurality of component carriers configured for a user equipment (UE) served by a base station, the plurality of TDD component carriers including a primary component carrier and a secondary component carrier, the primary component carrier having a same uplink:downlink configuration as a first cell at a neighboring base station, and the secondary component carrier having a different uplink:downlink configuration as a second cell at the neighboring base station;
sending control information on the primary component carrier to the UE; and
exchanging data on at least one of the plurality of component carriers with the UE.

* * * * *